United States Patent
Almadani et al.

(10) Patent No.: US 12,095,617 B2
(45) Date of Patent: *Sep. 17, 2024

(54) DEFINED NETWORK SYSTEM WITH SDN CONTROLLERS FOR NETWORK UPDATE REQUESTS

(71) Applicant: KING FAHD UNIVERSITY OF PETROLEUM AND MINERALS, Dhahran (SA)

(72) Inventors: Basem Almadani, Dhahran (SA); Abdurrahman Beg, Dacca (BD)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/606,868

(22) Filed: Mar. 15, 2024

(65) Prior Publication Data
US 2024/0223451 A1    Jul. 4, 2024

Related U.S. Application Data

(63) Continuation of application No. 17/860,669, filed on Jul. 8, 2022, now Pat. No. 11,973,644.
(Continued)

(51) Int. Cl.
*H04L 41/082* (2022.01)
*H04L 41/122* (2022.01)
*H04L 41/5006* (2022.01)

(52) U.S. Cl.
CPC .......... *H04L 41/082* (2013.01); *H04L 41/122* (2022.05); *H04L 41/5006* (2013.01)

(58) Field of Classification Search
CPC .................. H04L 45/02; H04L 41/5067; H04L 41/085; H04L 41/122
See application file for complete search history.

(56) References Cited

U.S. PATENT DOCUMENTS

| 8,745,185 B1 | 6/2014 | Salo |
| 10,270,712 B1 | 4/2019 | Lippitt et al. |

(Continued)

FOREIGN PATENT DOCUMENTS

| WO | WO 2021/074668 A1 | 4/2021 |

OTHER PUBLICATIONS

"The Real-time Publish-Subscribe Protocol (RTPS) DDS Interoperability Wire Protocol Specification", Object Management Group (OMG), Version 2.3, Document No. ptc/2018-09-03, Sep. 2018, pp. 1-185.
(Continued)

*Primary Examiner* — Tonia L Dollinger
*Assistant Examiner* — Linh T. Nguyen
(74) *Attorney, Agent, or Firm* — Oblon, McClelland, Maier & Neustadt, L.L.P.

(57) ABSTRACT

A system includes a network of multiple network domains, each network domain includes a software defined network (SDN) controller. Each SDN controller includes a network interface circuitry, a processor and a memory. The network interface circuitry provides a communicative coupling with at least one domain of the multiple network domains. The memory includes instructions that when executed by the processor, performs a network update comprising adding links, subtracting links or reporting a status of links in at least one network domain upon receiving a network update request, and performs sending and receiving the network update request to a second SDN controller, where the network update request is part of real-time publish/subscribe protocol, the sending network update request includes a publish message having a specified topic and a set of QoS attributes, and the receiving a network update request includes subscribing to the specified topic and the set of QoS attributes.

5 Claims, 27 Drawing Sheets

Related U.S. Application Data

(60) Provisional application No. 63/295,006, filed on Dec. 30, 2021.

(56) References Cited

U.S. PATENT DOCUMENTS

| | | | |
|---|---|---|---|
| 2004/0233882 A1* | 11/2004 | Park | H04L 45/00 370/254 |
| 2013/0058262 A1* | 3/2013 | Parreira | H04L 67/02 370/276 |
| 2013/0132533 A1 | 5/2013 | Padmanabhan | |
| 2015/0067021 A1 | 3/2015 | Protas | |
| 2015/0139238 A1 | 5/2015 | Pourzandi | |
| 2016/0057219 A1 | 2/2016 | Kore | |
| 2016/0254984 A1 | 9/2016 | Tekalp | |
| 2016/0344760 A1 | 11/2016 | Sarkesai | |
| 2017/0201455 A1 | 7/2017 | Amulothu | |
| 2020/0389360 A1 | 12/2020 | Boucadair | |
| 2021/0117242 A1 | 4/2021 | Van De Groenendaal et al. | |
| 2022/0103427 A1* | 3/2022 | Mallipudi | H04L 41/082 |
| 2022/0131954 A1 | 4/2022 | de Campos Ruiz | |
| 2022/0210047 A1* | 6/2022 | Venkatasubbaiah | H04L 45/16 |
| 2022/0394327 A1 | 12/2022 | Sampson | |

OTHER PUBLICATIONS

OMG; The Real-time Publish-Subscribe Protocol DDS Interoperability Wire Protocol (DDSI-RTPS) Specification; Apr. 1, 2022; Version 2.5; pp. 1-206.

Almadani et al., A distributed SON control plane framework for the east/west interface, Feb. 2021, IEEE, vol. 9, pp. 26735-26754. (Year: 2021).

Ali et al., An Effective Hierarchical Control Plane for Software-Defined Networks Leveraging TOPSIS for End-to-End QoS Class-Mapping, 2016, IEEE, vol. 4, pp. 1-18. (Year: 2016).

Wang et al., Toward an Adaptive Data Distribution Service for Dynamic Large-Scale Network-Centric Operation and Warfare (NCOW) Systems, 2008, IEEE, pp. 1-7. (Year: 2008).

* cited by examiner

\<terminated\> GenerateTransitionMatrix [Java Application] C:\Program Files\Java\jre1.8.0_271\bin\javaw.exe (1 Dec 2020, 11:05:45)

Pattern: [L, G, P, L, G, P, G, G, G, G, G, G, G, G, L, P, L, P, G, G, G, G, G, G, G, G, L, G, P, G, G, G, G, G, L, P, L, P, G, G, G, L, P, G, G, G, G, G, G, L, P, G, G, G, G, G, L, G, P, P, L, P, G, G, G, G, G, G, G, G, P, G, G, G, G, G, G, G, P, L, P, G, G, G, L, P, G, G, G, G, G, L, P, G, G, G, G, G, G, G, G, L, P, G, G, G, G, G, G, L, P, L, P, G, L, P, G, G, G, G, G, G, G, G, G, G, G, G, G, G, G, P, G, G, G, G, G, L, P, G, G, G, L, P, G, G, G, G, G, G, P, P, G, G, G, G, G, P, L, G, P, L, P, G, L, P, G, G, G, P, L, P, G, G, G, G, G, G, G, G, G, G, G, G, G, L, P, G, G, L, P, G, G, G, G, G, G, L, P, L, P, G, L, P, G, G, G, G, G, G, G, G, G, G, G, G, L, P, G, G, G, G, G, L, P, G, G, G, G, G, L, P, P, G, G, G, G, G, G, L, P, G, L, P, G, G, G, G, G, G, G, G, G, G, G, G, L, P, G, G, G, G, G, L, P, G]

Size of Pattern: 262
Number of States: 3
States: [L, G, P]
Transition Count Matrix: [[0, 8, 32], [27, 136, 11], [12, 31, 4]]
Sum of rows : [40, 174, 47]
Probability Matrix: [[0.0, 0.2, 0.8], [0.15517241, 0.7816092, 0.06321839], [0.25531915, 0.65957445, 0.08510638]]

------ Transition Matrix ------

| States | L | G | P |
|--------|------|------|------|
| L | 0 | 0.2 | 0.8 |
| G | 0.16 | 0.78 | 0.06 |
| P | 0.26 | 0.66 | 0.09 |

FIG. 16

DEFINED NETWORK SYSTEM WITH SDN CONTROLLERS FOR NETWORK UPDATE REQUESTS

CROSS-REFERENCE TO RELATED APPLICATIONS

The present application is a Continuation of U.S. application Ser. No. 17/860,669, now allowed, having a filing date of Jul. 8, 2022 which claims the benefit of priority to U.S. Provisional Application No. 63/295,006, having a filing date of Dec. 30, 2021, which is incorporated herein by reference in its entirety.

STATEMENT REGARDING PRIOR DISCLOSURE BY THE INVENTORS

Aspects of this technology are described in an article by the present inventors titled "DSF: A Distributed SDN Control Plane Framework for the East/West Interface," published on Feb. 8, 2021, in *IEEE Access*, vol. 9, pp. 26735-26754.

BACKGROUND

Technical Field

The present disclosure is directed to computer networking and, more particularly, to a distributed Software Defined Networking (SDN) control plane framework.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

An ever-increasing number of network-capable devices places a massive burden on modern networks. Communication infrastructure should provide quality-of-service essentials in terms of high bandwidth capacity, scalability, resiliency, and security. Programmable networks are viewed as a prevailing technique of encountering challenges introduced by accelerated expansion. An ability of software defined networking (SDN) to separate a control plane from a data plane and enable programmability of the network creates new ways to architect the network. Centralization of control logic introduces complexities in large-scale, distributed networks, such as performance bottlenecks and reliability. Distributed SDN controllers have been tried to overcome performance concerns. A lack of a communication standard among distributed SDN controllers, referred to as an East/West interface, presents a challenge in the adoption of SDN in large-scale, distributed networks. Distributed SDN control planes require tight synchronization of network topology information to maintain a holistic view of the network, enabling route optimization of data packets from endpoint to endpoint in large-scale, distributed networks. Known techniques of exchanging network state information vary with a wide range of protocols in the East/West interface. Many techniques lack the capability of cross-platform coordination, while others lack the ability to scalability. Also, known techniques primarily demonstrate the network state synchronization in networks with homogeneously distributed control planes.

SUMMARY

In an exemplary embodiment, a system comprising a network of multiple network domains, each network domain comprising a software defined network (SDN) controller is disclosed. Each of the SDN controllers includes a network interface circuitry, a processor and a memory. The network interface circuitry provides a communicative coupling with at least one domain of the multiple network domains. The memory includes stored instructions that, when executed by the processor, performs a network update comprising adding links, subtracting links or reporting a status of links in at least one network domain upon receiving a network update request, the memory further comprising instructions that when executed by a processor perform a method of sending and receiving the network update request to a second SDN controller wherein the network update request is part of a real-time publish/subscribe protocol wherein sending a network update request comprises a publish message wherein the publish message comprises a specified topic and a set of QoS attributes and the receiving a network update request comprises subscribing to the specified topic and the set of QoS attributes.

In another exemplary embodiment, a method of processing software defined network (SDN) updates for SDN controllers each of the SDN controllers is disclosed. The method includes a network interface circuitry to provide a communicative coupling with at least one network domain, a processor, and a memory. The memory includes stored instructions that, when executed by the processor, performs a method including monitoring for a network update request by a processor of a first SDN control plane controller, receiving, by the first SDN control plane controller, a network update request, performing a network update comprising adding links, subtracting links, or reporting a status of links in at least one network domain upon receiving the network update request, appending QoS attributes to the network update request, and sending the network update request to a second SDN control plane controller.

In another exemplary embodiment, a non-transitory computer readable medium having instructions stored therein for a heterogeneous software defined network controller is disclosed. The instruction when executed by one or more processors of a heterogeneous software defined network controller, cause the processors of a heterogeneous software defined network controller to: receive a network update request, confirm that a topic associated with the network update request is a topic subscribed to by the SDN controller, confirm one or more QOS parameters associated network update matches one or more QOS requirements of the SDN controller, perform a network update comprising adding, or deleting or reporting a status of network links, and publish the network update request to a second heterogeneous SDN controller wherein the second heterogeneous SDN controller is subscribed to the topic and QOS attributes associated with the network update.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 16 depicts an analysis output of a Markov chain tool from a log of an experiment with an 8-controller configuration, according to one or more embodiments.

DETAILED DESCRIPTION

Figure 1:
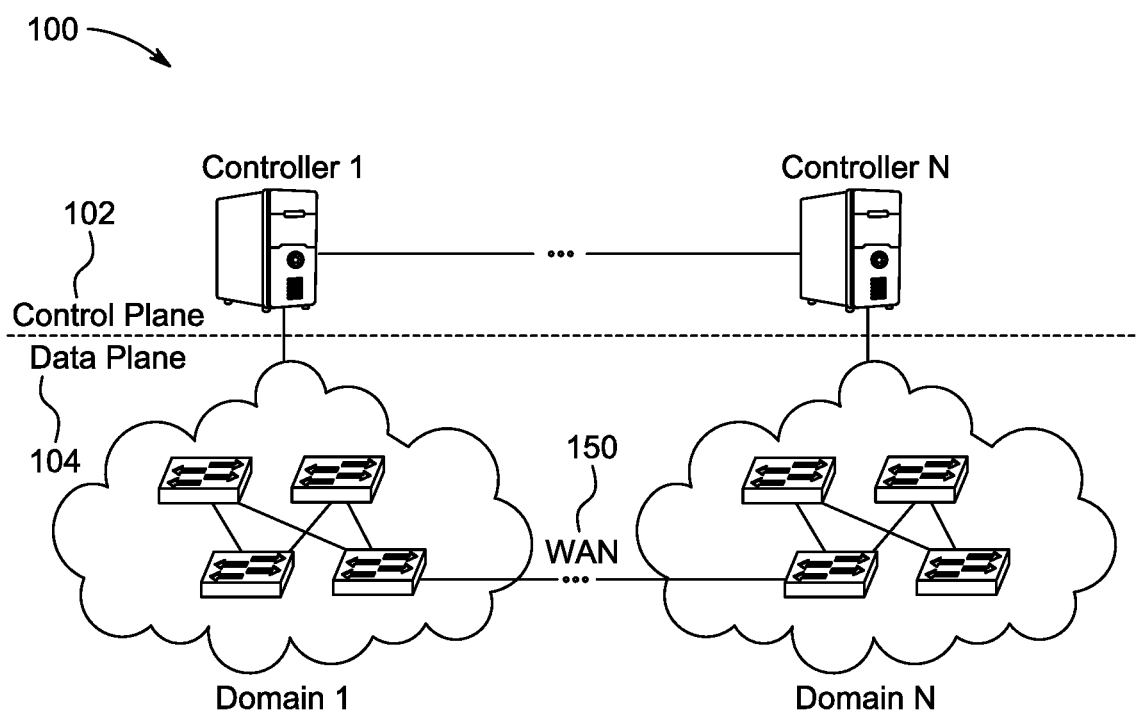
FIG. 1 illustrates an exemplary architecture of a logically-centralized control plane having several physically-distributed controllers cooperating to resolve a singular, consistent view of a network domain.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a Distributed Software Defined Networking (SDN) control plane Framework (DSF) for heterogeneous, distributed SDN controllers to synchronize topologies using a data-centric real-time publish/subscribe referred to as Data Distribution Service (DDS). The SDN is an approach to networking that uses software-based controllers or application programming interfaces (APIs) to communicate with underlying hardware infrastructure and direct traffic on a network. The SDN enables programmability, automation, and agility of services using physically or logically centralized controllers. The disclosure describes distributed control plane architectures using DSF: a flat model architecture, a hierarchical control plane model architecture, and a T-model architecture. The disclosure provides a DSF interface that is implemented on multiple SDN control plane platforms such as Floodlight and Open Network Operating System (ONOS) to evaluate performance. Test cases with different configurations are designed for performance evaluation of the disclosed DSF interface in homogeneous and heterogeneous SDN control planes. In addition, a performance comparison is presented of DSF-based ONOS controllers versus Atomix-based ONOS cluster solutions.

FIG. 1 illustrates a known exemplary architecture implementing a SDN by implementing a logically-centralized control plane having several physically-distributed controllers cooperating to resolve a singular, consistent view of a network domain. The exemplary architecture 100 is an East-West interface that illustrates SDN controllers 1-N that that are in peer-to-peer communication. Each controller can request information or connections from its peers (controller). The SDN divides network functions into a control plane 102 and a data plane 104. The control plane 102 includes controller 1 to controller N, where N is any natural number. The data plane 104 includes domains 1-N communicatively coupled through Wide Area Network (WAN) 150. Each domain 1-N in the data plane 104 is controlled by a corresponding controller 1-N. The controllers 1-N may represent administrator platforms for the domain 1-N of each data plane, synchronizing topologies to enable data packets to flow between data plane domains. As illustrated in FIG. 1, N number of domains is shown over WAN communication. The architecture of FIG. 1, may require a tight synchronization between controllers 1-N. Logically-centralized control planes were designed to expand the SDN to support large-scale, distributed networks where a logically-centralized controller governs a domain of forwarding elements within a large global domain network and participates in inter-domain communication with other controllers. A primary use of such controllers 1-N is in WANs and globally distributed data centers that require efficient inter-data center exchange over complex infrastructure and protocols (e.g., border gateway protocol and Multiprotocol Label Switching) that administer network traffic. An issue of scalability in the control plane 102 persists throughout classifications of SDN due to a distributed structure. Communication among the distributed entities, known as an East/West interface, is an important problem discussed due to an absence of a communication standard among inter-domain SDN entities.

The disclosure describes an adaptive framework for the East/West interface, referred to as Distributed SDN controller Framework (DSF). The DSF uses a standardized data-centric Real-Time Publish/Subscribe (RTPS) model. The DSF is an adaptive framework for the East/West interface designed for heterogeneous, distributed control planes to synchronize topologies using a standardized communication protocol. Malleable and modular architecture of the DSF interface enables implementation in a diverse array of SDN controller platforms. The disclosed DSF framework employs a data-centric RTPS model known as a Data Distribution Service (DDS) standard for the East/West interface.

Figure 2:
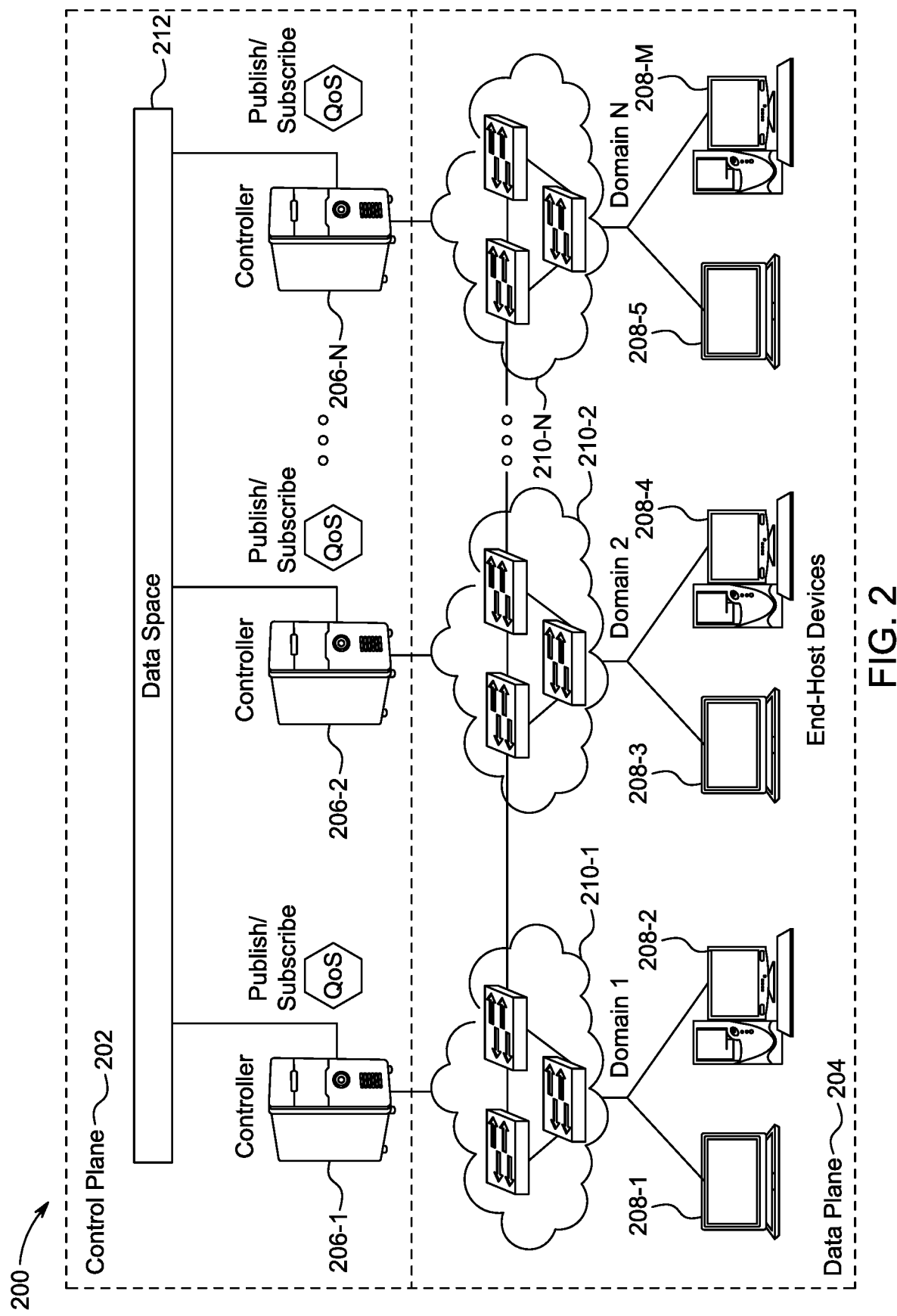
FIG. 2 shows an overview of a Distributed SDN controller Framework (DSF) framework in a heterogeneous, distributed Software Defined Networking (SDN) control plane with a flat model architecture, according to one or more embodiments.

FIG. 2 shows an overview of the DSF framework in a heterogeneous, distributed SDN control plane with a flat model architecture, according to one or more embodiments. The DSF interface supports three types of distributed control plane strategies enabled by the DSF interface: a flat model architecture, a hierarchical control plane model architecture, and a T-model architecture. The architecture shown in FIG. 2 is the flat model architecture. The flat model architecture is also referred to as horizontal architecture. Control plane entities communicate within a network domain by implementing DomainParticipants hosted by DSF components. The disclosed DSF framework is vendor-agnostic to a selection of the DDS implementation and adaptive to a programming language of a controller platform. To support topology synchronization, a messaging protocol is adhered to, referred to as 'topics' is used, although other messaging protocols can be used. FIG. 2 illustrates a control plane 202 and a data plane 204. The control plane 202 includes SDN controllers 1-N that control corresponding domains 210-1-N in the data plane. The SDN controllers hereinafter are referred to as controllers for the sake of simplicity.

Each controller in the control plane 202 may publish a message having a specified topic and a set of Quality-of-Service (QOS) attributes and/or subscribe to the specified topic and the set of QoS attribute. Each of the domains 210-1-N may have one or more end-host devices. For example, domain 210-1 may have end-host devices 208-1 and 208-2, domain 210-2 may have end-host devices 208-3 and 208-4, and domain 210-N may have end-host devices 208-5 and 208-M, where M is an integer. The DSF framework provides a channel for controllers 1-N to read and write samples of network state information topics, referred to as a data space 212. In the flat model architecture, distributed controllers in topology behave as peer nodes. Nodes (or controllers 206-1-N) publish local network state changes into domain data space with predefined topic structure and QoS attributes. Nodes (or controllers 206-1-N) are subscribed to network state information updates of all other peers.

The network state information updates are stored at individual nodes from which a global view of an administrative domain of the network is built and maintained. In the flat model architecture, every node or controller 206-1-N maintains a global view of the network. The flat framework architecture meets the objectives such as scalability, heterogeneity, reliability, security and timeliness. In response to any network update, each controller in the control plane 202 may publish a network update comprising adding links, subtracting links or reporting a status of links in at least one network domain upon receiving a network update request. Each controller in the control plane 202 may send and/or receive the network update request to an another SDN controller. The network update request may be a part of a real-time publish/subscribe protocol. Sending a network update request includes a publish message having a specified topic and a set of QoS attributes. Receiving a network update request includes subscribing to the specified topic and the set of QoS attributes.

Figure 3:
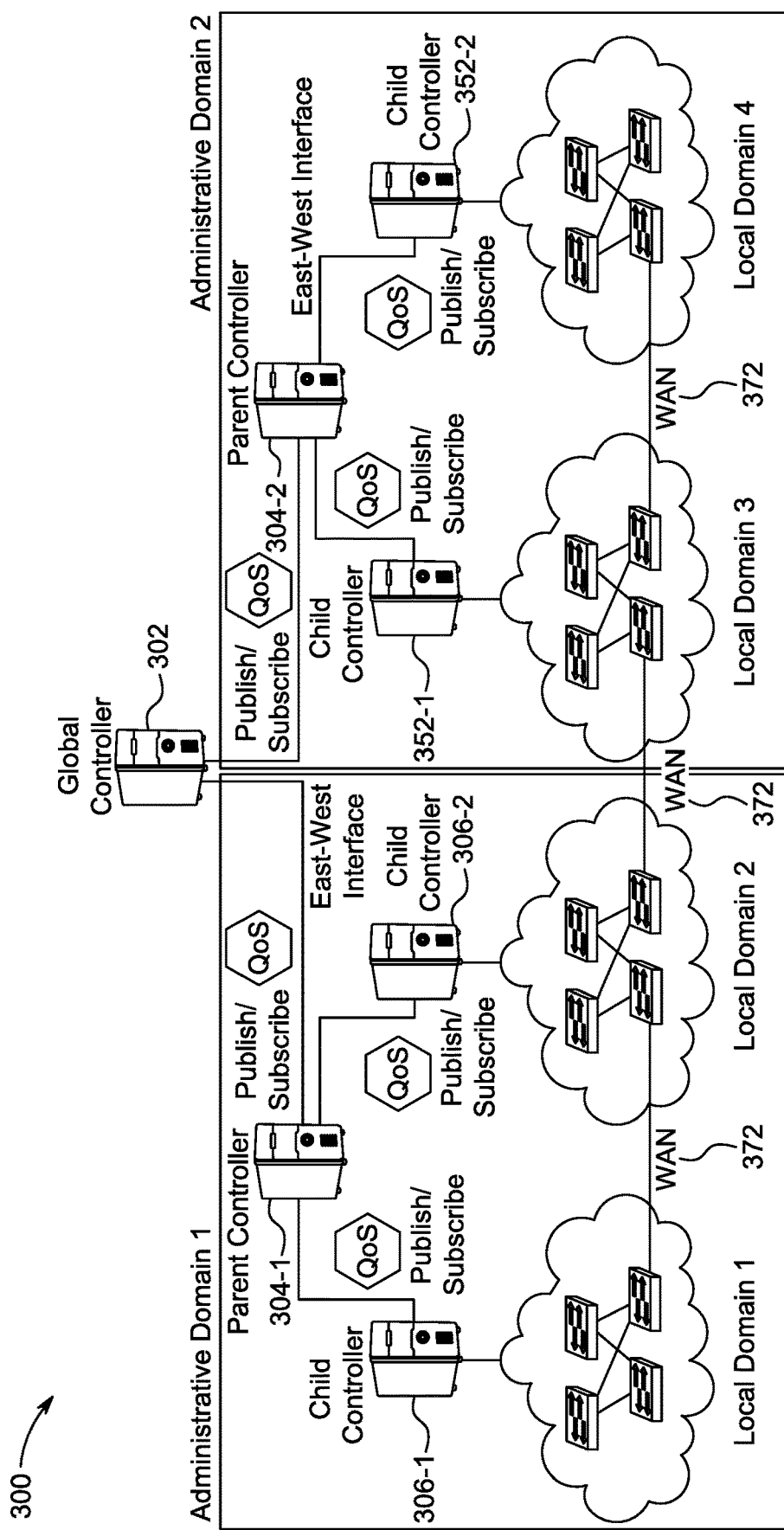
FIG. 3 depicts a DSF framework employed in a hierarchical control plane model architecture, according to one or more embodiments.

FIG. 3 depicts the DSF framework employed in a hierarchical control plane model architecture, according to one or more embodiments. The DSF framework employed in a hierarchical control plane model architecture is also referred to as a hierarchical vertical model topology. As illustrated in FIG. 3, the DSF framework in a hierarchical control plane model architecture includes a global controller 302 controlling a parent controller 304-1 in administrative domain 1 and a parent controller 304-2 in administrative domain 2. Although, only two administrative domains are shown, the architecture can have more than or less than two administrative domains. The global controller 302 is a root of the hierarchical control plane model where the state information of local and administrative domains are collected. The global controller 302 generates a global view for northbound network management applications. The northbound network management applications may refer to applications in the network that communicate with higher level network components. For example, applications in a parent controller that can communicate with applications or components of the global controller 302 may be referred to as the northbound network management applications. Similarly, southbound network management applications may refer to applications in the network that communicate with lower level network components. The parent controller 304-1 includes at least a child controller 306-1 and a child controller 306-2. The parent controller 304-1 may publish a message having a specified topic and a set of QoS attributes and/or subscribe to the specified topic and the set of QoS attributes. Similarly, the parent controller 304-2 includes at least a child controller 352-1 and a child controller 352-2. The parent controller 304-2 may publish a message having a specified topic and a set of QoS attributes and/or subscribe to the specified topic and the set of QoS attributes. Although only two parent controllers 304-1-2 are shown for the global controller 302, the architecture can have more than or less than two-parent controllers. The child controller 306-1 may control a local domain 1, and the child controller 306-2 may control a local domain 2. The child controller 352-1 may control a local domain 3, and the child controller 252-2 may control a local domain 4. Although child controllers are shown for each parent controllers, the architecture can have more than or less than two child controllers for each parent controllers. Each of the local domain 1-local domain 4 are connected to each other through WAN. In one or more embodiments, the parent controllers 304-1-2 administrate over their corresponding child controllers 306-1-2 and child controllers 352-1-2 per respective administrative domain. In the architecture, link updates are configured to flow vertically in a tree-topology structure between parent/child controllers. The global controller 302 is a root of the tree maintaining a holistic view of the network for northbound applications managing flow control. When there is a network update request, the SDN controllers (for example, the controller 306-1) publish the network update request to another parent or child SDN controller (for example, the controller 306-2) until the network update request reaches a first administrative domain root (for example, the controller 304-1). The first administrative domain root (for example, the controller 304-1) publishes the network update request to a global controller (for example, the controller 302). The global controller (for example, the controller 302) shares the network update request with other administrative domain roots (for example, the controller 304-2).

The distributed controllers 304-1, 304-2, 306-1, 306-2, 352-1, 352-2, etc., follow a chain of command in a tree-topology structure. The child controllers 306-1, 306-2, 352-1, 352-2, etc., update governing parent controllers 304-1, 304-2, of their local state information through publish/subscribe topic samples applied with QoS attributes. The parent controllers 304-1, 304-2, store and combines state information of their corresponding child domains, generating a holistic view. The parent node is a child node of a larger administrative domain entity, and the combined view is then shared with those upper-tier entities, known as global controllers.

Figure 4A:
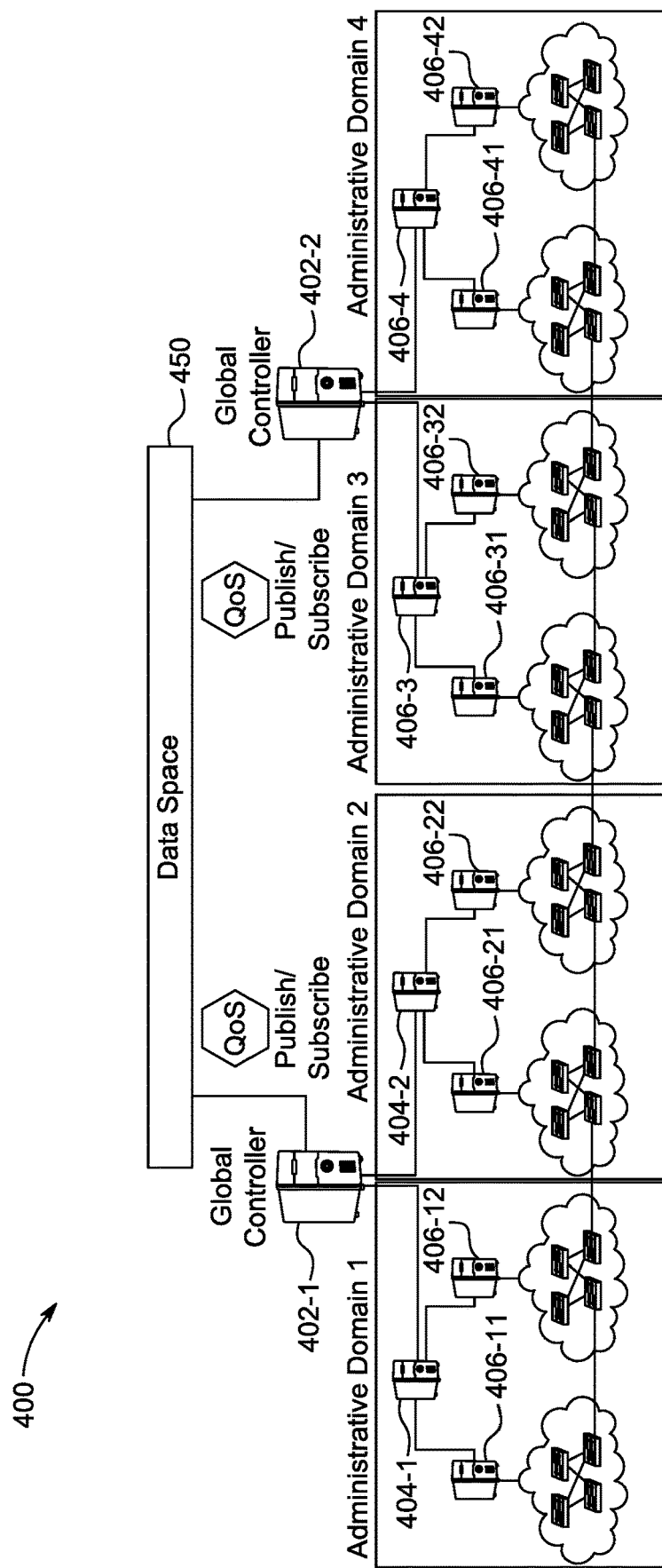
FIG. 4A depicts a DSF framework employed in a T-model distributed controller architecture, according to one or more embodiments.

FIG. 4A depicts the DSF framework employed in a T-model distributed controller architecture, according to one or more embodiments. The T-model distributed controller architecture is a hybrid of the hierarchical control plane model architecture (shown in FIG. 3) and the flat model architecture (shown in FIG. 2) for large and geographically distributed networks. In the T-model distributed controller architecture, global controllers 402-1 and 402-2 are root of corresponding tree-topology structure for multi-administrative local domains, sharing a holistic view of their tree with global controllers via a flat model architecture. The global controllers 402-1 control administrative domain 1 and administrative domain 2 under its span. Each of the administrative domain 1 and the administrative domain 2 may have corresponding parent controllers and child controllers that control corresponding domains. For example, the administrative domain 1 and administrative domain 2 under the global controller 402-1 include parent controller 404-1 and 404-2, respectively. The parent controller 404-1 controls the child controllers 406-11 and 406-12. Similarly, the parent controller 404-2 controls the child controllers 406-21 and 406-22. The child controllers 406-11 and 406-12 may control their corresponding domains. Similarly, the child controllers 406-21 and 406-22 may control their corresponding domains. Similarly, the administrative domain 3 and the administrative domain 4 under the global controller 402-2 include parent controllers 404-3 and 404-4. The parent controller 404-3 controls the child controllers 406-32 and 406-32. Similarly, the parent controller 404-4 controls the child controllers 406-41 and 406-42. The child controllers 406-31 and 406-32 may control their corresponding domains. Similarly, the child controllers 406-41 and 406-42 may control their corresponding domains.

The T-model distributed controller architecture (also referred to as the T-model) is configured for large-scale distributed networks expanding multiple geographical locations. The T-model uses vertical distribution of state information for local hierarchical networks and horizontal distribution for global flat networks in large-scale global networks. Network state information moves through the hierarchy in a vertical manner from a child controller to a parent controller until it reaches the root of the geographic administrative domain. Once a holistic view of the respective domain is formed at the root controller, the domain view is then disseminated horizontally among peer controllers for each root or global controller to attain and construct the holistic view of their local state information through publish/subscribe topic samples applied with QoS attributes. When there is a network update request, each of the SDN controllers (for example, the controller 406-11) publishes the network update received from its own network in a vertical manner in a parent-child fashion (for example, from the controller 406-11 to the controller 404-1) until the network update request reaches a root controller (for example, the global controller 402-1) of a first network. The root controller (for example, the global controller 402-1) of the first network (for example, the administrative domain 1) then transmits its network update request in a horizontal manner to a second root controller (for example, the global controller 402-2) of a second network (for example, the administrative domain 2) through the data space 450. The disclosure now describes a SDN controller (referred to as a controller) used in the flat model architecture (described in FIG. 2), a hierarchical control plane model architecture (described in FIG. 3), and a T-model architecture (described in FIG. 4A).

Figure 4B:
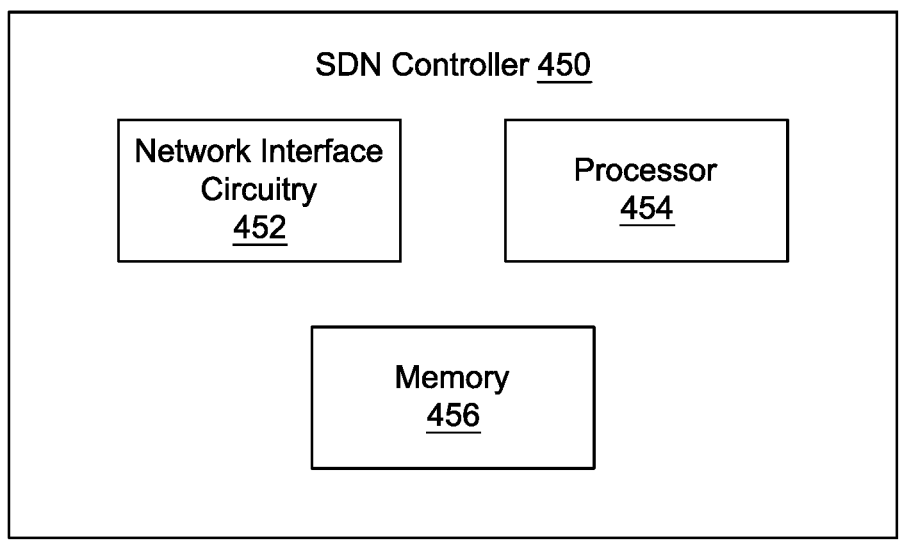
FIG. 4B describes a SDN controller used in DSF framework implemented in FIG. 2-FIG. 4A, according to one or more embodiments.

FIG. 4B describes the SDN controller (referred to in this figure as SDN controller 450) used in DSF framework implemented in FIG. 2-FIG. 4A, according to one or more embodiments. Each of the SDN controller 250 may include a network interface circuitry 452, a processor 454, and a memory 456.

The network interface circuitry 452 may be a hardware component such as a circuit board or chip, which is installed on a computing device to connect the computing device to a network. In some embodiments, the network interface circuitry 452 may be a software implementation of the hardware component. The network interface circuitry 452 is configured to provide a communicative coupling of an SDN controller with at least one domain of the multiple network domains. The processor 454 may be a hardware component or a software component that executes instructions, for example, to generate output data based on data inputs. The instructions can include programs, codes, scripts, or other types of data stored in memory.

The memory 456 may be a storage unit. In some examples, the memory may be a computer-readable storage media, for example, a volatile memory device, a non-volatile memory device, or both. The memory 456 can include one or more read-only memory devices, random-access memory devices, buffer memory devices, or a combination of these and other types of memory devices. The memory 456 may store instructions that are executable by processor 454. For example, the instructions may include, inter alia, performing a network update including adding links, subtracting links or reporting a status of links in at least one network domain upon receiving a network update request. In some examples, the memory 456 further include instructions that when executed by the processor 454 performs a method of sending and receiving the network update request to a second SDN controller 458. The network update request is part of a real-time publish/subscribe protocol. In some embodiments, the real-time publish/subscribe protocol conforms to an Object Management Group Data Distribution Service (DDS) standard v2.5. In some examples, sending a network update request includes a publish message, where the publish message comprises a specified topic and a set of QoS attributes. In some examples, receiving the network update request includes subscribing to the specified topic and the set of QoS attributes. In some embodiments, the QoS attributes for the network update request includes values for reliability, durability, history, resource limits and lifespan of the network update. In some examples, the memory 456 further includes instructions that when executed by the processor 454 provides encrypting and decrypting of the network update requests.

The memory 456 of the SDN controller 450 stores instructions to communicate network update requests to a plurality of other SDN controllers, where each SDN controller includes a processor, network interface circuitry, and memory. Considering an example such as in hierarchical vertical model topology (the hierarchical control plane model architecture of FIG. 3), the network update request is shared with other SDN controllers 306-2 (considering that the network update request is initiated by the SDN controller 306-1), where each SDN controller publishes the network update request to another parent controller 304-1-2 or child SDN controller (if any) until the network update request reaches a corresponding administrative domain root (for example, parent controller 304-1). Further, the administrative domain root (for example, the SDN controller 304-1-2) publishes the network update request to the global controller 302, and the global controller 302 shares the network update request with other administrative domain roots (for example, administrative domain 2).

Considering an example such as in T-model topology (for example, the T-model distributed controller architecture of FIG. 4A), each of the SDN controllers publish the network update received from its own network in a vertical manner in a parent-child fashion until the network update request reaches a root controller of a first network. For example, the network update request is shared with other SDN controllers 406-12 (considering that the network update request is initiated by the SDN controller 406-11), where each SDN controller publishes the network update request to the parent controller 404-1 or the child SDN controller (if any) until the network update request reaches a corresponding administrative domain root (that is, the global controller 402-1).

Further, the root controller (that is, the global controller 402-1) of the first network then transmits its network update request in a horizontal manner to a second root controller (for example, the global controller 402-2) of a second network. The network update request may be shared over the data space.

Figure 5:
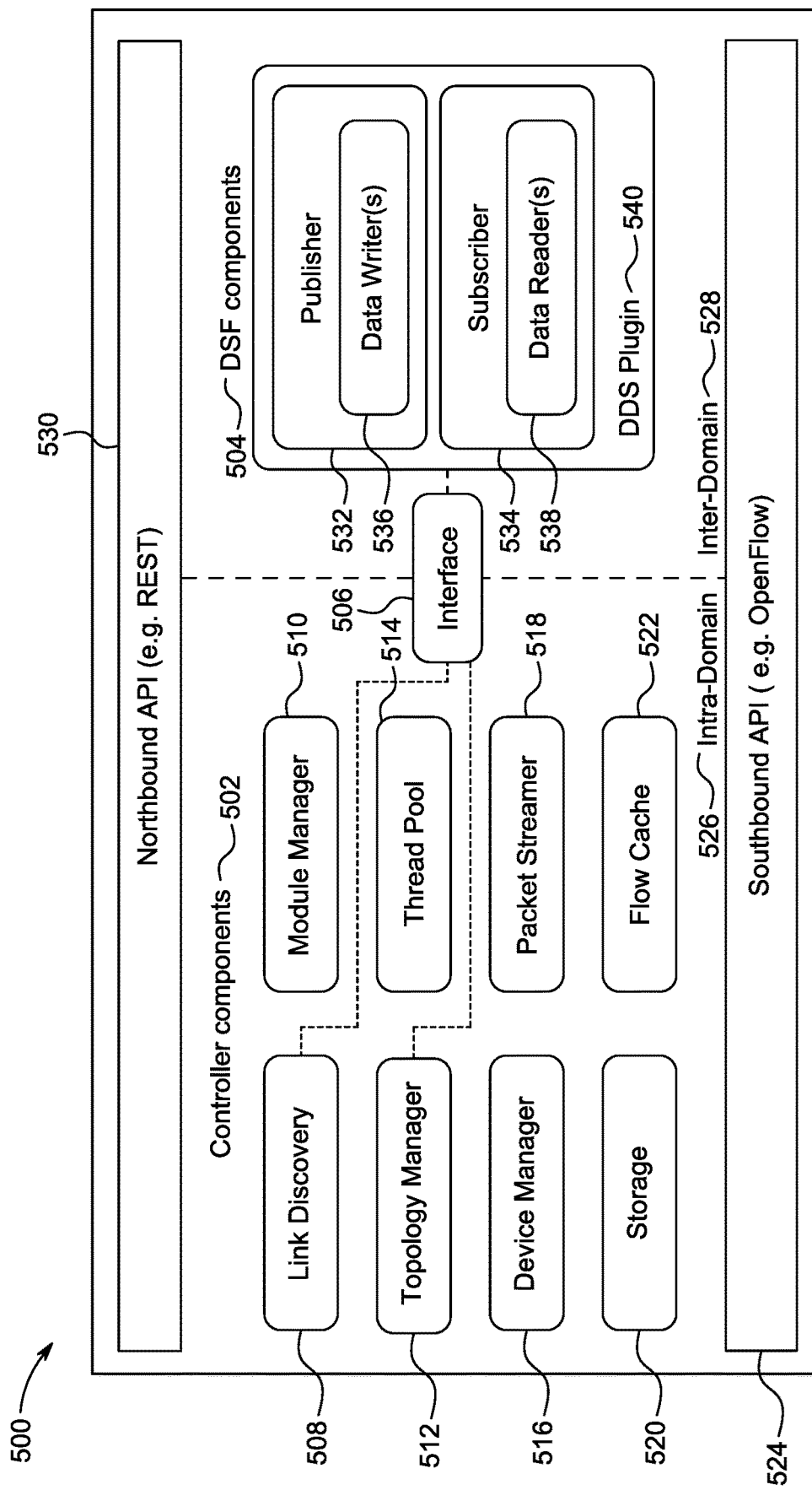
FIG. 5 depicts a controller architecture installed with DSF interface, according to one or more embodiments.

This section presents modular controller components interacting with the DSF interface. A function of interface modules may be identical in varying controller platforms, demonstrated between two controller platforms in the implementation section. FIG. 5 describes a controller architecture installed with a DSF interface 506. The controller architecture includes controller components 502 and DSF components 504. The controller components 502 are tasked with managing data plane forwarding entities via a southbound interface such as OpenFlow protocol implemented using an Application Programming Interface (API). The controller components 502 are part of intra-domain 526 and DSF components 504 are part of inter-domain 528. The DSF components 504 interact with the controller components 502 to synchronize topologies due to link changes in the local domain and global domain.

The controller components 502 include a link discovery 508, a module manager 510, a topology manager 512, a thread pool 514, a device manager 516, a packer streamer 518, storage 520 and flow cache 522. The link discovery 508 is a component that listens for new samples of link discovery updates. The module manager 510 controls the functioning of all the controller components. The topology manager 512 is a unit that updates a network topology instance, calculating new possible shortest routes. The thread pool 514 is a queue of threads available to run a collection of tasks for the controller 500. The device manager 516 controls the overall functioning of the controller 500. The packer streamer 518 streams the packets including the data packets. The storage 520 stores instructions and data. The flow cache 522 is a cache for incoming and outgoing data packets.

The DSF components 504 includes a DDS plugin 540 that includes a publisher 532 and a subscriber 534. The publisher monitors the topology manager 512 using an interface 506. A link update is generated when a topology event occurs at the topology manager 512. A sub-module TopologyService updates listener entities of the link change. The publisher 532 receives the link update and forwards it to the relevant data writer(s) entity 536 within the DSF components 504. The data writer(s) entity 536 then creates a sample of an update following the topic data structure assigned with QoS attributes. This sample or notification is then published into a data space of a specified domain.

The subscriber 534 receives link update notifications from the global domain which matches its subscription of the topic data structure and QoS attributes. Data reader(s) 538 participants within the subscriber 534 read samples from the data space matching with the predefined subscriptions. The data reader(s) 538 then updates the topology manager 512 of the received samples through the interface 506.

The topology manager 512 administrates the local view and global view of the network, generating link updates from local domain events and receiving updates from global domains through the subscriber 534. The topology manager 512 maintains the topology instance of the network, providing access to network management applications through a northbound API 530 which may be implemented using, for example, Representational State Transfer (REST). The implementation of this topology manager 512 may be dependent on an architecture of the controller platform. A primary function of network topology maintenance remains consistent across platforms for the topology manager 512.

The interface 506 performs a task of coordinating between the controller 503 and the DSF components 504 of the controller 500. Two primary sub-components of the interface 506 are a listener and a service (not shown). The listener is an interface implemented by the topology manager 512. When a global link update event arrives at the subscriber 534, the service subcomponent notifies all modules implementing the listener, thus notifying the topology manager 512 of the update. The DSF components 504 and the controller components 502 may directly interact without using an intermediary interface 506 depending on the architecture of the controller 500.

Link Update Message Protocol (LUMP) is described in this section. The LUMP is the messaging protocol in the DSF framework to communicate link updates among inter-domain controllers. A data structure is dependent upon the southbound protocol used by the implementation of the interface 506. For example, OpenFlow is a southbound communications protocol or an API that provides access to data plane or forwarding entities over the network. Published samples of OpenFlow-based controllers are structured with following message format:

- nodeID: node ID represents controller ID. The controller ID is used to distinguish between controllers participating in the domain for logging purposes.
- operation: the operation describes the operation of the link discovery update. The operation includes a link status between data plane entities such as: link up, down, removed or updated.
- srcMAC: the srcMAC provides the source MAC address.
- srcPort: the srcMAC provides the source port number.
- dstMAC: the dstMAC provides the destination MAC address.
- dstPort: the dstMAC provides the destination port number.
- latency: the latency provides the latency of the unidirectional exchange between data plane entities.
- type: the type provides a link type between data plane forwarding entities: internal, external, tunnel or invalid.

An overview of the data-centric RTPS DDS standard is provided in this section describing core functionalities and components. QoS attributes provided by the data-centric RTPS DDS standard and its capability of delivering reliable, secure, and timesensitive data exchange is elaborated. A primary merit of using data-centric RTPS DDS standard in the SDN control plane domain is the enabling of a large number of participants to communicate asynchronously and in real-time in contrast to client/server-based or broker-based models which incur additional processing delays, limit simultaneous read/write operations, and introduce a risk of single point of failures. In addition, secure end-to-end data connectivity is ensured by the data-centric RTPS DDS standard through security plugins enabling authentication, encryption, access control, and logging capabilities.

Figure 6:
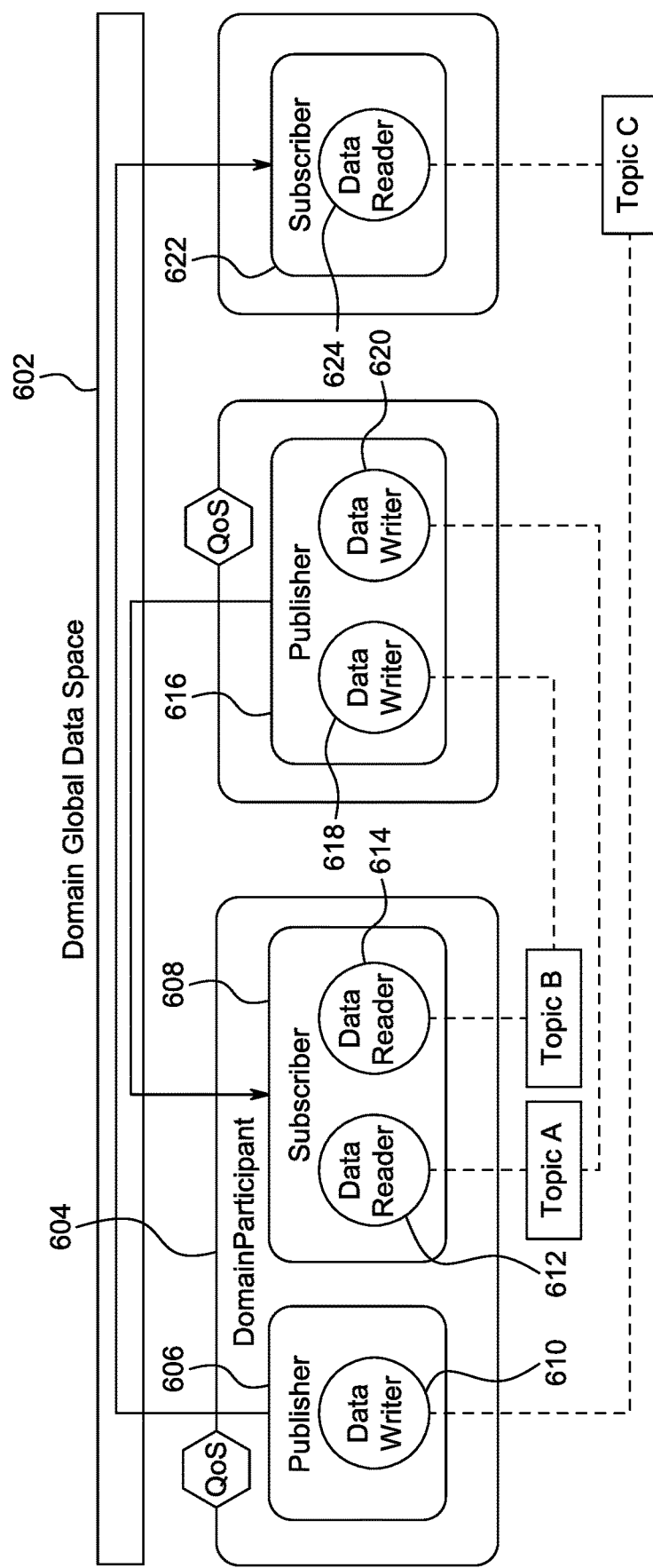
FIG. 6 depicts an RTPS-DDS communication architecture, according to one or more embodiments.

Data-centricity focus of the data-centric RTPS DDS standard allows a system to decide what data to preserve and control how that data is shared. The data-centric RTPS DDS standard implements a virtual store, known as the domain global data space as shown in FIG. 6. The RTPS-DDS communication architecture as shown in FIG. 6 highlights a function of a domain global data space 602. The domain global data space 602 enables peer-to-peer communication such as domain participants with predefined topic structures and QoS profiles. DomainParticipant 604 includes a publisher 606 and a subscriber 608 components with one or many data reader/data writer entities which read/write samples with QoS attributes, respectively. For example, the publisher 606 includes data writer 610, and the subscriber 608 includes data reader 612 and data reader 614. Publisher 616 includes data writer 618 and data writer 620, and the subscriber 622 includes data reader 624. As an example, the publisher 606 exchanges units of data through data writer 610 with the data reader 624 of the subscriber 622 on a topic C through the domain global data space 602. Similarly, the data writer 618 of the publisher 616 exchanges a unit of data with data reader 614 of the subscriber 608 on topic B through the domain global data space 602. Further, the data writer 620 of the publisher 616 exchanges a unit of data with data reader 612 of the subscriber 608 on topic A through the domain global data space 602. To the individual network node, the domain global data space 602 may appear like native memory accessed via an API. A unit of data exchanged in the domain global data space 602 is a sample of a specific topic, a data structure tied to a specific set of QoS attributes known as a QoS profile. This profile describes the data samples' non-functional requirements. The RTPS-DDS is unique in its monitoring of non-functional requirements of data it controls, such as reliability, time constraints, and durability. Using QoS properties, the RTPS-DDS is capable of providing a consistent view of the shared data to all participating peers in the system.

An entity joining the domain global data space 602 implements a DomainParticipant consisting of a set of publisher and subscriber entities, each capable of containing one or more data writers and data readers. Data writers and data readers publish and subscribe data samples with specific data structures and QoS profiles.

A description of key attributes of the data-centric RTPS-DDS standard are described in this section. Listed are the key factors that encompass the functional attributes of the RTPS-DDS communication architecture:

- Publish/Subscribe paradigm: This paradigm is required for a discovery and management of new features, and for incoming/outgoing data among inter-domain controllers.
- Lifecycle awareness: DDS standard monitors information status and activity for its application systems. For example, first and last sample updates for each topic instance.
- Relational data modeling: DDS mimics data management of Relational Database Management System (RDMS). Tailored requests are enabled by DDS through its reliance on structure-related topics in terms of time and content settings used by the filters.
- Reliable multi-cast: User Datagram Protocol (UDP) sockets are utilized for multi-cast. Enabling real-time streaming of data in contrast to the typical Transmission Control Protocol (TCP) sockets in the client/server approach.

The RTPS-DDS communication architecture includes the following entities:

- Domain: Data publishing/subscription is handled per domain basis, and domains are virtually separated from each other. Participants of one domain cannot share information with participants in another domain.
- Topic: Topics are data structures that define the sample information to be exchanged. A Data Writer and Data Reader are connected indirectly through the shared topic samples. For example, a distributed set of sensors may publish information about a specific topic, e.g., temperature data updates.

Publisher: A publisher is a set of data writers updating new samples of the topics that are subscribed to by Data Readers. It may filter samples generated and share only information about the topic should a predefined threshold be met. This QoS feature decreases the load on the network.

Subscriber: The subscriber is a set of data readers receiving new samples of the data topics that it in interested in.

Discoverer: Endpoint Discovery Phase (EDP) and Participant Discovery Phase (PDP) are discovery phases within DDS that enable new participants joining the domain to dynamically discover the other participants and their endpoints in the domain.

The following QoS attributes of RTPS-DDS communication architecture are implemented for the DSF interface:

Reliability: This attribute defines the level of reliability the service provides. 'Reliable' value is opted for DSF due to the impact of each link update on the routing of the data packet.

Durability: The attribute expresses if the data should persist after writing time. The value 'Transient', 'Transient-local', or 'Persistent' is suitable for instances of DSF application with dynamically joining SDN controllers per domain, otherwise, the 'Volatile' value is selected.

History: An important QoS attribute for the framework when multiple new link updates are generated before the former ones are communicated to subscribers. This attribute assists in administrating a queue. 'Keep-all' value is selected for the framework for the importance of transmitting all intermediate link updates.

Resource limits: The resource limits attribute defines the resources allocated to the service for queuing samples on both Publisher and Subscriber entities.

Lifespan: This attribute indicates to the service the maximum time the sample is valid after being written into the network domain. This cleans up the network of previous, perhaps obsolete, link update samples in DSF.

The following section describes about security provided in RTPS-DDS communication architecture. Object Management Group (OMG), the body which formalized the DDS standard, provides a formal security specification for the RTPS-DDS, which describes a security model and Service Plugin Interface (SPI) architecture for the DDS implementations, decoupling security aspects into a set of plugins:

Authentication: The plugin ensures RTPS-DDS entities, the SDN controllers, are authenticated with set credentials. The purpose is to avoid data contamination from unauthenticated participants.

Access Control: The plugin monitors and administrates access control permissions for DDS topics, domains, etc., for authenticated participants.

Cryptography: The plugin enables encryption, digest, message authentication codes, and key exchange (public/private keys). The aim is to preserve the integrity and confidentiality of the data.

Logging: This plugin provides the capability to log all security events, inclusive of expected behavior and all violations of security policies and errors. The key aim of this plugin is to enable auditing to analyze methods to improve availability.

The set of security plugins enable different implementations of the disclosed framework to define policies based on their own security objectives.

The following section provides implementation information. The implementation assesses a performance and adaptive capabilities of the disclosed interface in multi-domain control plane environments. The DSF interface is implemented on, for example, Floodlight (FL) and Open Network Operating System (ONOS) controller platforms, although other platforms can also be used for implementation.

Experiment test cases were designed to measure performance metrics in different configurations. Test cases include performance evaluation of FL and ONOS controllers implemented with DSF interface, performance evaluation of DSF-based ONOS compared to Atomix-based ONOS cluster, a case study of a multi-organization heterogeneous data center network, and Markov chain analysis of controller state transitions and traffic analysis of RTPS packet transmissions.

LUMP communication protocol is used for topology synchronization between the controllers. The interface definition language (IDL) data structure in C language of the protocol is shown in listing 1.

| | Listing 1 | |
|---|---|---|
| 1 | Struct GPS_Postion { | |
| 2 | Int id; | |
| 3 | string operation; | //updateOperation |
| 4 | string srcMAC: | //DatapathId |
| 5 | string srcPort: | //OFPort |
| 6 | string dstMAC: | //DatapathId |
| 7 | string dstPort: | //OFPort |
| 8 | string latency: | //U64 |
| 9 | string type: | //LinkType |
| 10 | }; | |

The OpenFlow data types listed in the commented text are not supported by DDS libraries used for this evaluation and require translation to primitive data types.

Figure 7:
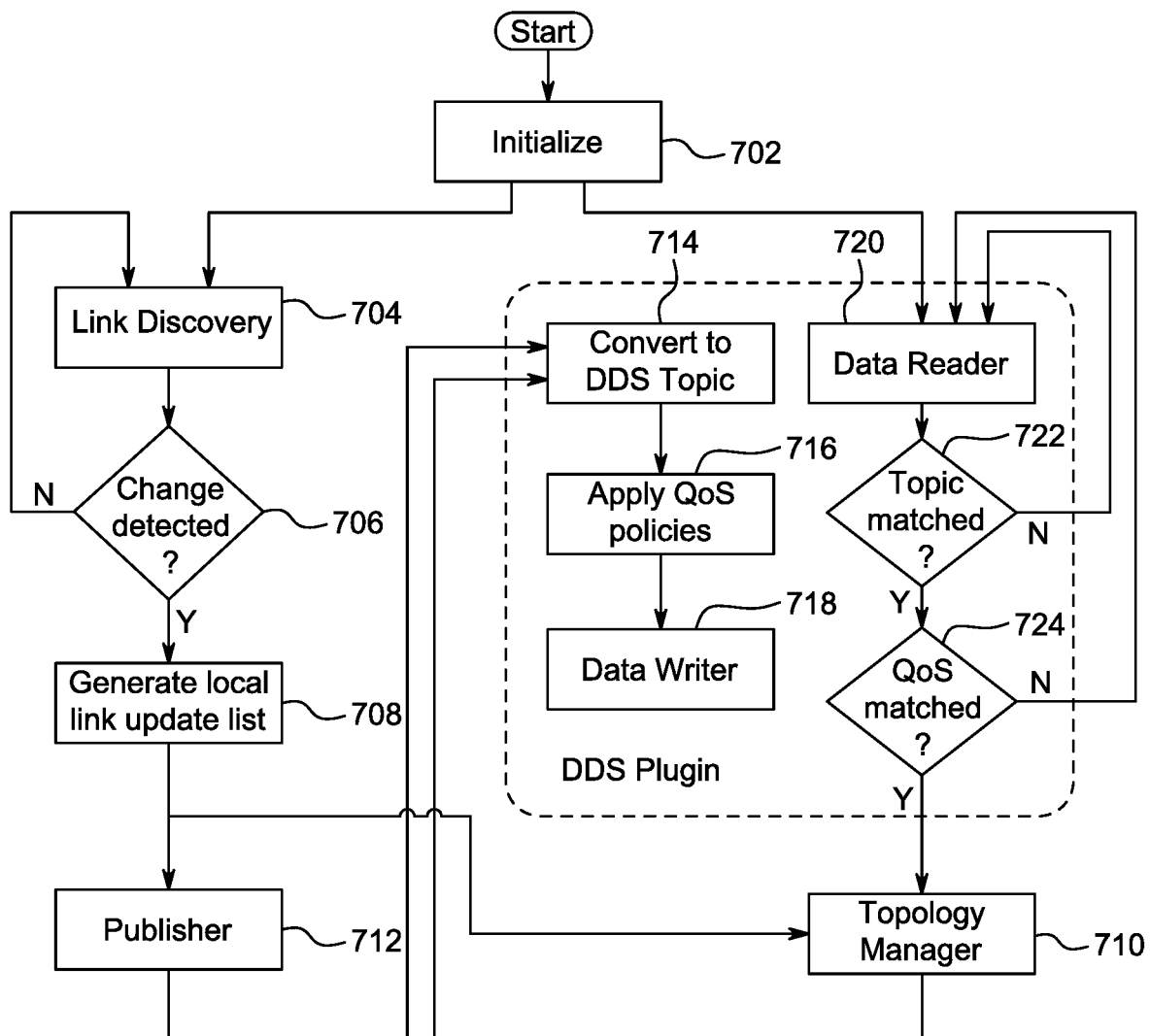
FIG. 7 describes a flow of control logic in DSF-based controller platforms, according to one or more embodiments.

FIG. 7 describes a flow of control logic in DSF-based controller platforms, according to one or more embodiments. At an initial state (step 702), a controller periodically sends Link Layer Discovery Protocol (LLDP) packets encapsulated in a Packet-out message to its directly connected data plane forwarding entities (routers/switches). The forwarding entity receives and reads the instructions on the Packet-out message to forward the packet to a specific neighboring peer. The neighbor peer forwards the packet via Packet-in message to the SDN controller 500. In step 704, the SDN controller verifies the unidirectional link between the two peers with its records determining if it is an existing, new, updated, or deleted link in case of no reply. If a change has occurred, in step 706, a link discovery update list is generated by the controller. In step 708, local link update list is generated by the controller. Otherwise, the link discovery 508 continues to monitor for LLDP packets. The link discovery update list is observed by two modules in the controller 500: the internal topology manager 512 in step 710 and the publisher 532 in step 712. In step 714, the topology manager 512 updates the topology instance of the controller, and the publisher forwards the update to the DDS Plugin 540 within the DSF framework. In step 716, the DDS Plugin 540 may apply QoS policies. In step 718, the DDS plugin 540 converts the update into a topic sample and writes it into the domain global data space 602 through the data writer sub-module (for example, data writer 610) with predefined QoS attributes.

Simultaneously, in step 720, the controller 500 listens for new samples of link discovery updates via the data reader in the domain global data space 602 published by peer controllers via DSF subscriber (for example, subscriber 534). The data reader entity 538 of the DDS Plugin 540 filters the received samples with the link discovery update topic structure (in step 722) and QoS attribute requirements (in step 724). Once matched, the sample is forwarded to the topology manager 512 to update the network topology instance, calculating new possible shortest routes.

A controller architecture of FL and ONOS with DSF interface is described in this section. FL architecture in FIG. 5 described DSF components coordinating with internal core components using the DSF module Interface. The interface 506, as described previously, monitors internal modules for link updates and notifies the publisher 532. The publisher 532 sends the link update as a DDS sample using LUMP topic structure to the global data space. The subscriber 534 receives link update samples from the data space, the interface 506 notifies the internal module topology manager of the global link update.

Figure 8:
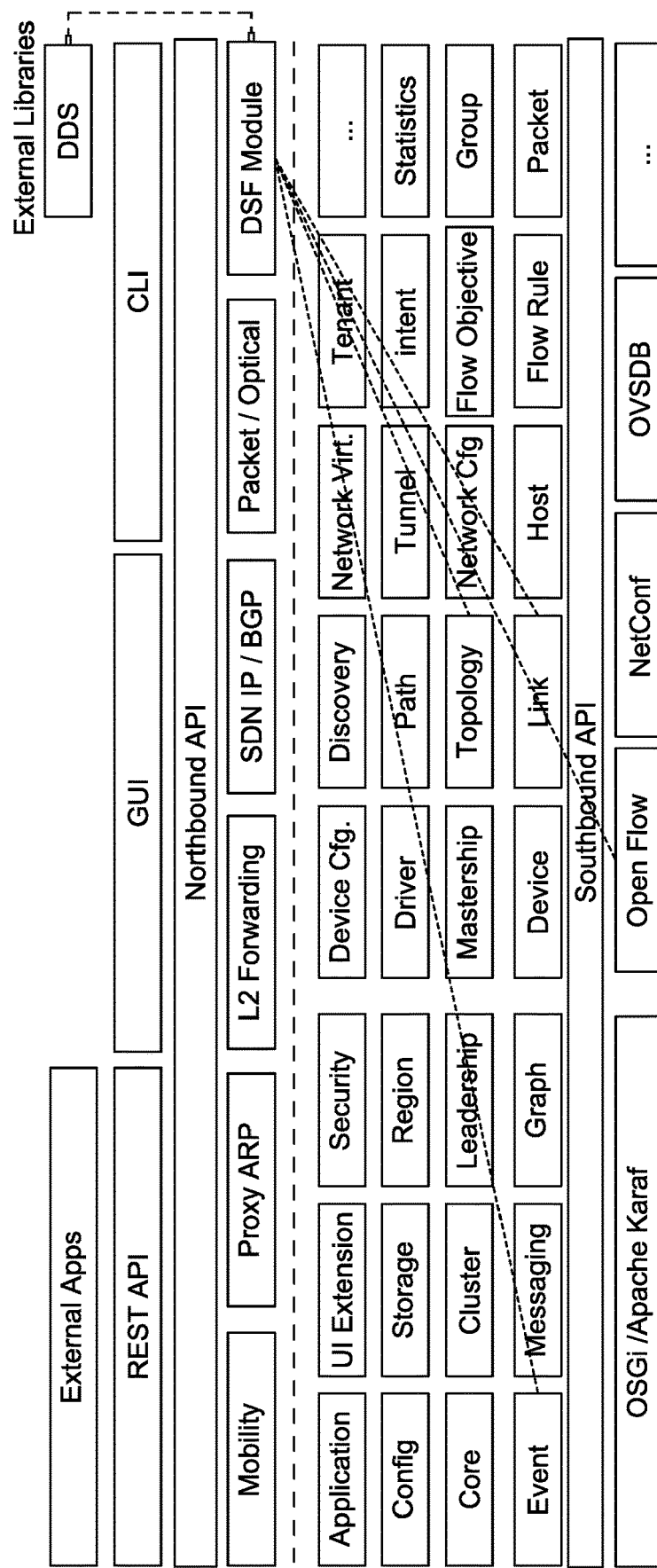
FIG. 8 depicts an ONOS architecture with DSF interface, according to one or more embodiments.

ONOS architecture with DSF interface is presented in FIG. 8. The DSF module interacts with internal modules using a topology listener and service, sub-components of the interface. DSF module listens to topology internal module for a link event to occur. The event is an abstracted module that describes link events. Events may include link module abstractions. The DSF module extracts a link update information from the link instance, converts the data to OpenFlow structure using OpenFlow API libraries, and creates a sample in the LUMP message structure using DDS libraries. The DSF module then publishes the DDS sample using the publisher subcomponent within the DSF module.

TABLE 1 aDDS Physical host specification.

| Item | Specification |
|---|---|
| CPU | Intel(R) Core(TM) i5-8250U CPU @ 1.60 GHz |
| Operating System | Windows 10 Build 18363 (64-bit) |
| Main Memory | 20 GB |
| Network Adapter | Qualcomm Atheros QCA9377 |

Table 1 lists the specifications of the physical host machine used for the emulation and Table 2 lists the specifications of the virtual machines (VMs) that host SDN controllers and the SDN emulator. Versions of Ubuntu operating systems for VMs differed due to SDN controller platform dependencies. Main memory assigned to VMs also varied based on the test case configurations elaborated in the experiment description.

TABLE 2

Virtual machine specification.

| Item | Specification(s) |
|---|---|
| No. of CPU(s) | 2 |
| Operating Systems | Ubuntu 16.04 & 18.04 (64-bit) |
| Main Memory | 2-8 GB |
| Network Adapters | NAT & Host-only Adapter |

Software specifications for the experiments and analysis of performance measurements are listed in Table 3. Two SDN controllers with DSF interface were emulated. Markov analysis tool is a Java application written in this project to automate the process of generating the probability state transition matrices from experiment logs to analyze SDN controller state transitions, described further in experiment descriptions.

TABLE 3

Software specification.

| Item | Specification(s) |
|---|---|
| SDN Controllers | FL v1.2 & ONOS v2.4.0 |
| SDN Network Emulator | Mininet |
| RTPS Implementation | RTI Connext DDS 6.0.1 |
| Network Packet Analyzer | Wireshark |
| Markov Analysis Tool | Java Application |

The following performance metrics are measured in the experiments:

Network Convergence Point (NCP): The time taken for the network to converge into one consistent, holistic topology after a link discovery update sample is published into the domain data space.

Topology Update Delay (TUD): The time taken for the link update packet to reach the peer controller to update the holistic view of the network. —RTPS Packet Transmissions (Packets/sec): The number of RTPS packets generated and transmitted per second.

RTPS Packet Transmissions (Packets/sec): The number of RTPS packets generated and transmitted per second.

Network convergence point is modeled in this section as a metric describing the time for a set of processes in a publish/subscribe technique to receive notifications. Publish/subscribe methods can be classified into two types: broker-based and broker-less models. DSF architecture enables SDN controllers to communicate in a peer-to-peer fashion through the use of a data-centric RTPS paradigm, thus following a broker-less model with no intermediary entities. Brokerbased models use intermediary entities to facilitate communication, such as queues in AMQP and file storage nodes in WheelFS publish/subscribe methods. In a distributed SDN environment, each control plane entity is a decoupled process. The decoupled processes communicate through a channel known as the domain data space. A distributed system consists of a set of processes as denoted by equation (1).

$$\prod = \{p_1, p_2, \ldots p_x\}. \quad (1)$$

A subscription σ is a pair of process p applied with filter ϕ, where the p is subscribed to all other processes publishing samples through the specified filter is denoted by equation (2). The filter consists of both the topic structure and the QoS profile attached to the sample in DSF.

$$\sigma = (\phi, p) \text{ "where" } p \in \prod. \quad (2)$$

There are four main operations in a publish/subscribe model: publish, subscribe, unsubscribe and notification. A notification n matches the filter ϕ if each property of n matches all constraints detailed in ϕ. That is to say, both topic structure and QoS profile of n matches the filter. Equation (3) denotes the principle of notification n matching a subscription σ.

$$n \sqsubseteq \sigma \cdot \phi. \quad (3)$$

In the event of a publication occurring, the service disseminates the notification to interested subscribers which are processes whose subscriptions matches the notification as described by equation (3). The time for notification n to reach an individual process $p_i$ is $T_{p_i}$, and the delay is denoted by as $\Delta_i$. Suppose a set of subscribers $\{p_x, p_y, p_z\}$ are interested in n. The total delay for the dissemination of n to the set of interested subscribers is the maximum of those delays as seen in equation (4):

$$T_{ncp} = \max\{\Delta_x, \Delta_y, \Delta_z\}. \quad (4)$$

Therefore, by measuring the time taken to reach the network convergence point shown in (4), the performance of DSF in the implementation was evaluated. The objective is to measure the delay in the dissemination of link update packets within the network as the number of SDN controller nodes increases. Minimizing this delay supports controller entities in maintaining a real-time, holistic view of the network. Sometimes, however, an additional processing delay may be incurred while generating the holistic view. This processing delay is dependent upon the controller platform, and an assumption is made that this delay is measured within $\Delta_i$, the time for notification n to reach process $p_i$.

Some experiments are described in this section. The experiments are divided into three primary test cases: performance evaluation of DSF-based controller platforms in homogeneous networks, a case study of multi-organization heterogeneous Data Center Networks (DCN), and Markov chain analysis of controller state transitions and traffic analysis of RTPS packet transmissions.

Test Case 1: Performance Evaluation of DSF-Based Controller Platforms in Homogenous Networks The primary objective of this test case is to evaluate the performance of the DSF interface implemented in FL and ONOS controllers in homogeneous networks. The secondary objective is to provide a performance comparison between the DSF interface and industry-used techniques. The technique that is compared against the DSF interface is an Atomix distributed cluster management framework. Atomix-based ONOS cluster networks are compared against DSF-based ONOS networks. The performance evaluation is characterized by capturing measurements of network convergence point and topology update delay after a link update event. The number of controllers is incrementally increased per network configuration to the maximum capacity of the physical host machine. Table 4 lists the parameters of the Floodlight-DSF homogeneous network experiments. A pair of virtual machines (VMs) hosts the controllers, while a third contains the Mininet SDN emulator. Mininet assigns each remote controller two data plane switches and a host device per switch, referred to as the local domain. Hosts are used for Internet Control Message Protocol (ICMP) ping tests between local domains administrated by peer control plane entities for verification of the network topology synchronization. Multiple controllers are hosted per VM to maximize the number of controllers emulated in the network with the physical host machine capabilities, reaching 12 FL controllers over two VMs. The number of controllers in the network configuration increased incrementally by one per VM. 10 repetitions are conducted per configuration to estimate the variability of the results due to experimental error.

TABLE 4

Test Case Parameters - FL.

| Parameter | Configuration |
| --- | --- |
| Virtual machines | 3 |
| Controllers per VM | 1-6 |
| Controllers | 2-12 |
| Switches per controller | 2 |
| Hosts per switch | 1 |
| No. of repetitions (n) | 10 |

Table 5 lists the configuration for the ONOS-DSF homogeneous network experiments. Each ONOS controller requires 2 GB of main memory per VM. Mininet assigns each remote controller two data plane switches and a host device per switch. Mininet VM and six ONOS controllers VMs exhaust the main memory capacity of the physical host machine. Due to the relatively small-scale network emulation, a comprehensive scalability performance evaluation of the DSF interface is not performed in this work. Instead, illustrating consistency of the interface is prioritized in homogeneous networks and adaptive nature in heterogeneous networks described in the second test case.

TABLE 5

Test Case Parameters - ONOS.

| Parameter | Configuration |
| --- | --- |
| Virtual machines | 3-7 |
| Controllers per VM | 1 |
| Controllers | 2-6 |
| Switches per controller | 2 |
| Hosts per switch | 1 |
| No. of repetitions (n) | 10 |

To provide a comparison between the DSF interface and alternative methods of topology synchronization, the performance of DSF-based ONOS networks and Atomix-based ONOS cluster networks were measured. Atomix is a cluster management framework that uses brokers to synchronize controller states, referred to as agents. Three agents are configured for Atomix-based ONOS cluster networks. Both methods of ONOS inter-controller communications incrementally increase by one controller up to six emulations of each platform with Mininet VM emulating the network. However, the incremental increase provides a baseline performance comparison of DSF interface, expected to synchronize networks in real-time, but compromises performance for consistency and flexibility of adapting to heterogeneous control plane platforms compared to homogeneous distributed systems.

Figure 9:
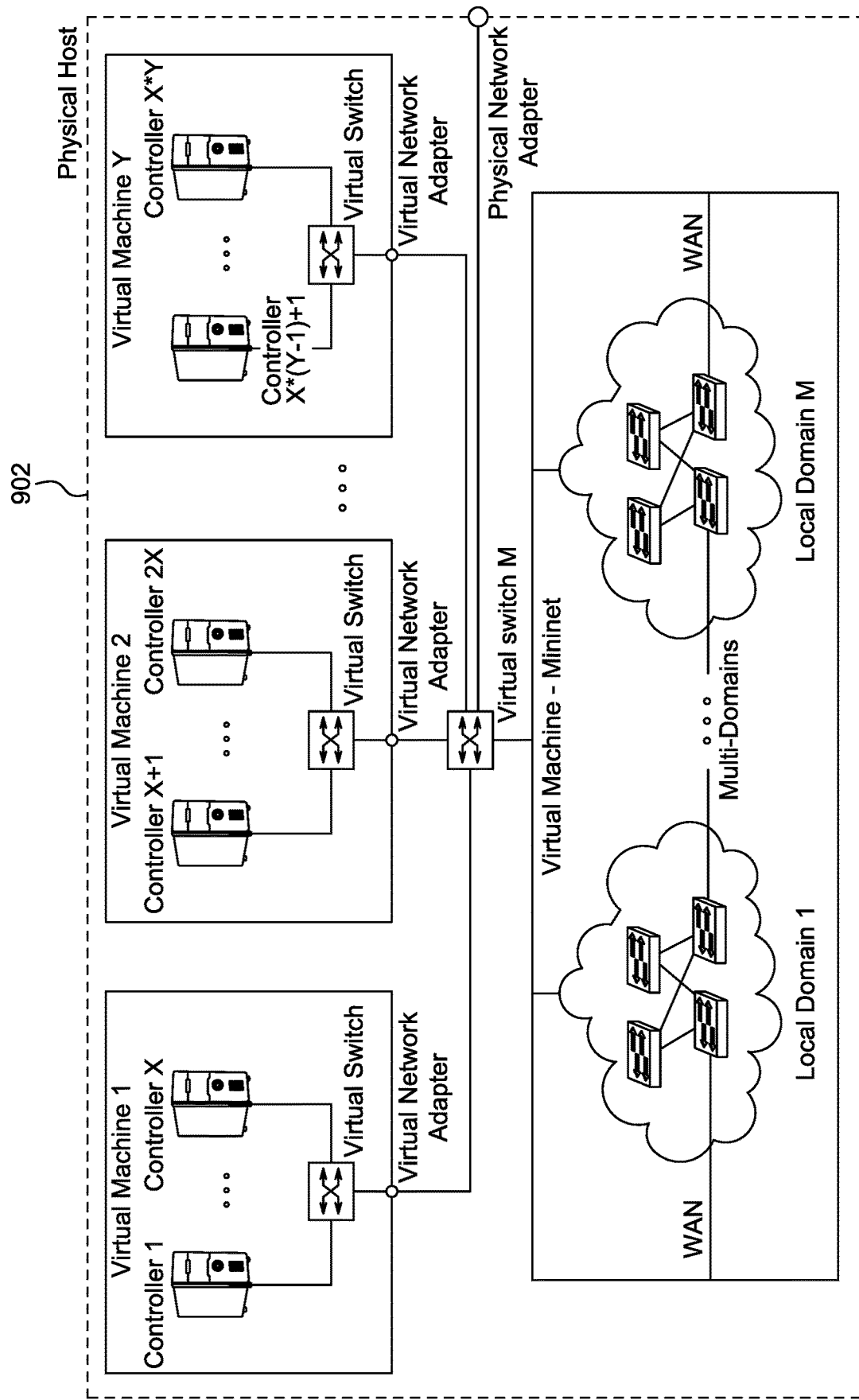
FIG. 9 describes a design of emulation environment for various configurations of test cases, according to one or more embodiments.

FIG. 9 describes a design of the emulation environment for various configurations of test cases. The emulation environment includes several virtual machines 1-Y implemented in a physical host 902. Each virtual machine includes one or more sets of controllers, with each controller administrating over a local domain of data forwarding devices. For example, virtual machine 1 includes controller 1 to controller X, virtual machine 2 includes controller X+1 to controller 2X, and virtual machine Y includes controller X*(Y−1) to controller X*Y. Each controller is coupled to their peers in their corresponding virtual machines through a virtual switch. The virtual machines 1-Y are coupled to a virtual switch M through their corresponding virtual network adapter. The network is emulated by Mininet on a separate virtual machine. A python script, for example, creates the network on Mininet VM, linking the hosts with their assigned switches and switches with their remote controllers via IP address and port number paired ID using TCP connection.

Test Case 2: Case Study—Multi-Organization Heterogeneous Data Center Network

Figure 10:
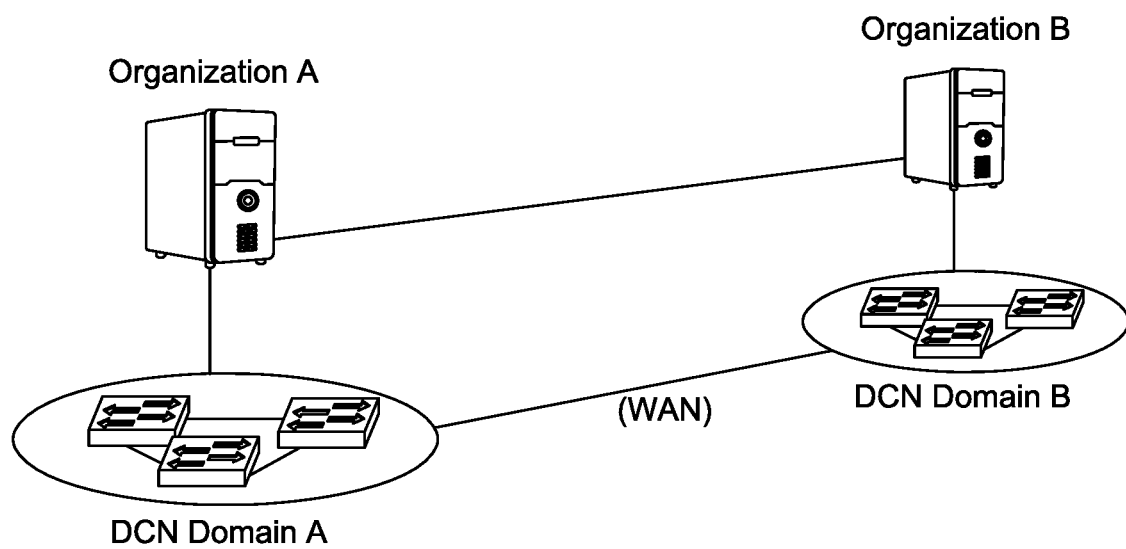
FIG. 10 describes a Data Center Networks (DCN) with organizations cooperating with heterogeneous controller platforms controlling corresponding DCN domains, according to one or more embodiments.

In this case study, a collaboration agreement between multiple organizations is assumed requiring data sharing capabilities between inter-domain data center networks, e.g., content delivery networks. Participating organizations utilize different control plane platforms for their specific data center SDN implementation. In this case study, Floodlight and ONOS platforms were used. FIG. 10 describes the DCN with organizations cooperating with heterogeneous controller platforms controlling corresponding DCN domains (DCN domain for Organization A and DCN Domain B for Organization B). Data plane entities forward content between domains with flow configurations determined by the controller platforms synchronizing network topologies. DSF interface is implemented in each controller platform to enable topology synchronization. The test case captures performance metrics like the number of SDN controllers per platform increases per organization. The experiment design consists of controllers hosted on separate virtual machines assigned with data forwarding and host devices by a Mininet VM. 10 repetitions of the experiments are conducted of the three network configurations: X=1, 2 and 3, where X is the number of DSF implemented controllers per platform: FL and ONOS.

Test Case 3—Markov Chain Analysis of State Transitions and RTPS Packet Transmissions Measurement This test case was designed to provide two primary insights in the performance analysis of the DSF interface: Markov chain of controller state transitions and RTPS packets transmission measurement. The Markov chain analysis experiments measure a probability of state transitions in DSF-based controllers in network configurations with 4, 8, and 12 controllers. For each configuration, an experiment was conducted for 30 minutes to record state transitions. The log from the experiment was then processed by a custom Markov chain analysis tool written for this work to generate the probability transition matrix. The matrix describes the DSF-based controller state behavior during steady-state conditions in different network configurations. Link updates are not simulated from external sources but are generated in steady-state conditions as the cost of links in terms of latency changes and new optimal shortest routes are calculated.

RTPS packet transmissions are captured using Wireshark network packet analyzer tool for experiments containing 2, 4, and 8 DSF-based controllers. The objective was to analyze the number of RTPS packets transmitted over 120 seconds time period and during link update events. A further experiment was conducted to compare all packets transmitted versus RTPS transmissions in an 8-controller network configuration for traffic analysis.

The analysis of results is separated into the following sections: analysis of NCP, analysis of TUD, Markov chain analysis of DSF controller state transitions, analysis of RTPS packet transmissions, and performance evaluation of NCP.

Analysis of Network Convergence Point

FIG. 11A-D describes a time taken for networks to converge into a single, holistic topology after a link discovery update packet is published by a control plane entity. The y-axis describes the time elapsed till NCP for test cases: homogeneous DSF-based controller platforms of FL and ONOS networks in FIG. 11A and FIG. 11C respectively, homogeneous Atomix-based ONOS cluster networks in FIG. 11D, and heterogeneous data center networks compromising of both DSF based platforms in the same configuration in FIG. 11B. FIG. 11A-D describes results of 10 repetitions of time taken for networks to converge into a single, holistic view after a link discovery update event occurs is displayed. Networks configurations include FL-DSF shown in FIG. 11A, DCN-DSF shown in FIG. 11B, ONOS-DSF shown in FIG. 11C, and ONOS-cluster shown in FIG. 11D, with differing numbers of controllers per configuration.

Figure 11A:
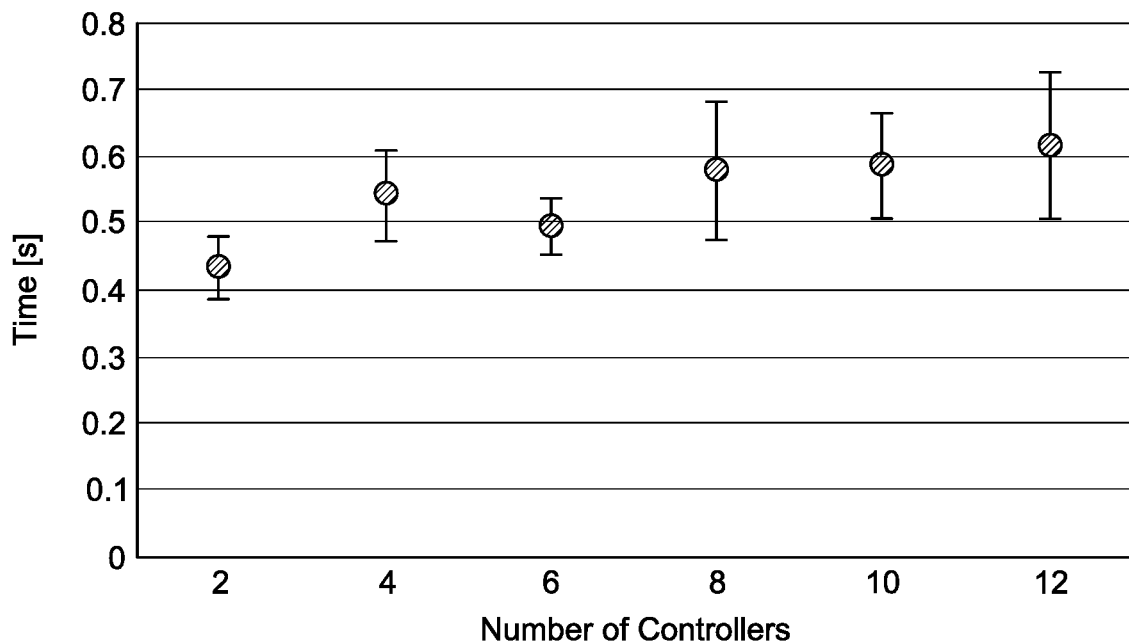
FIG. 11A depicts a time taken by a FloodLight (FL)-DSF network to converge into a single, holistic topology, according to one or more embodiments.
Figure 11B:
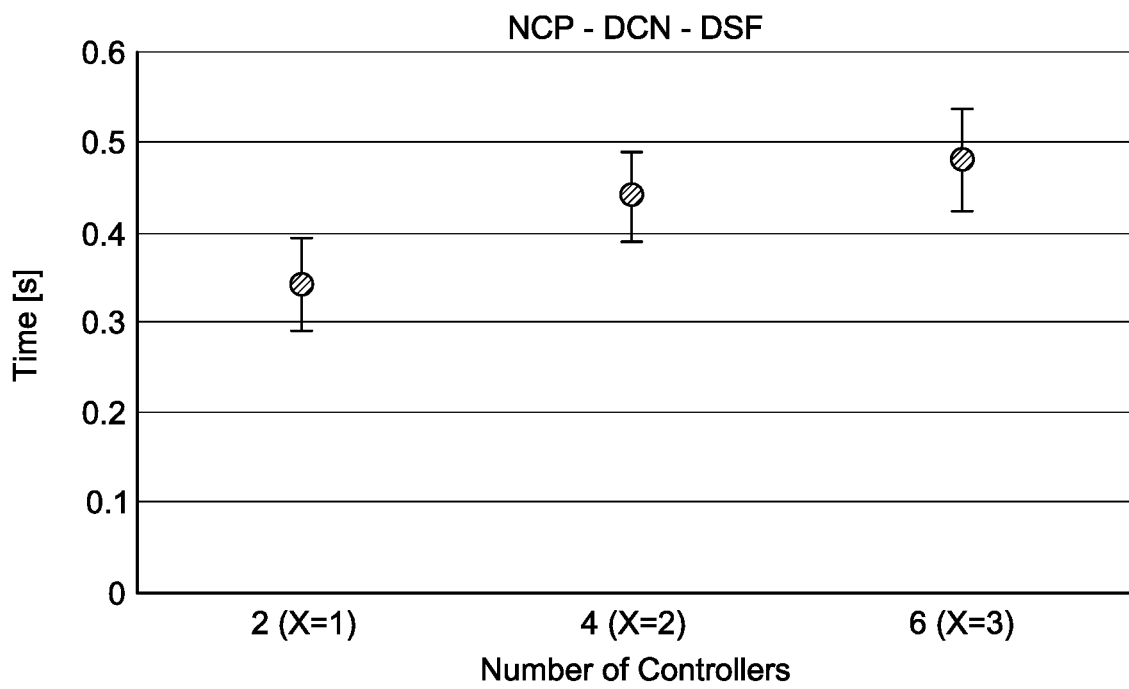
FIG. 11B depicts a time taken by DCN-DSF networks to converge into a single, holistic topology, according to one or more embodiments.

FIG. 11A shows FL-DSF networks converge within half-a-second to six-tenths of a second on average as the number of controllers per network configuration increases. The standard error of the mean (SEM) of the 10 repetitions is roughly equal between the different network configurations except for the network with two FL-DSF controllers which takes less than half-a-second to converge. This performance remains consistent in DSF implemented heterogeneous networks compromised of FL and ONOS controllers described by FIG. 11B. FLDSF delays the time to reach convergence in all three DCN configurations. This observation is elaborated in the analysis of the topology update delay metric in the next subsection.

Figure 11C:
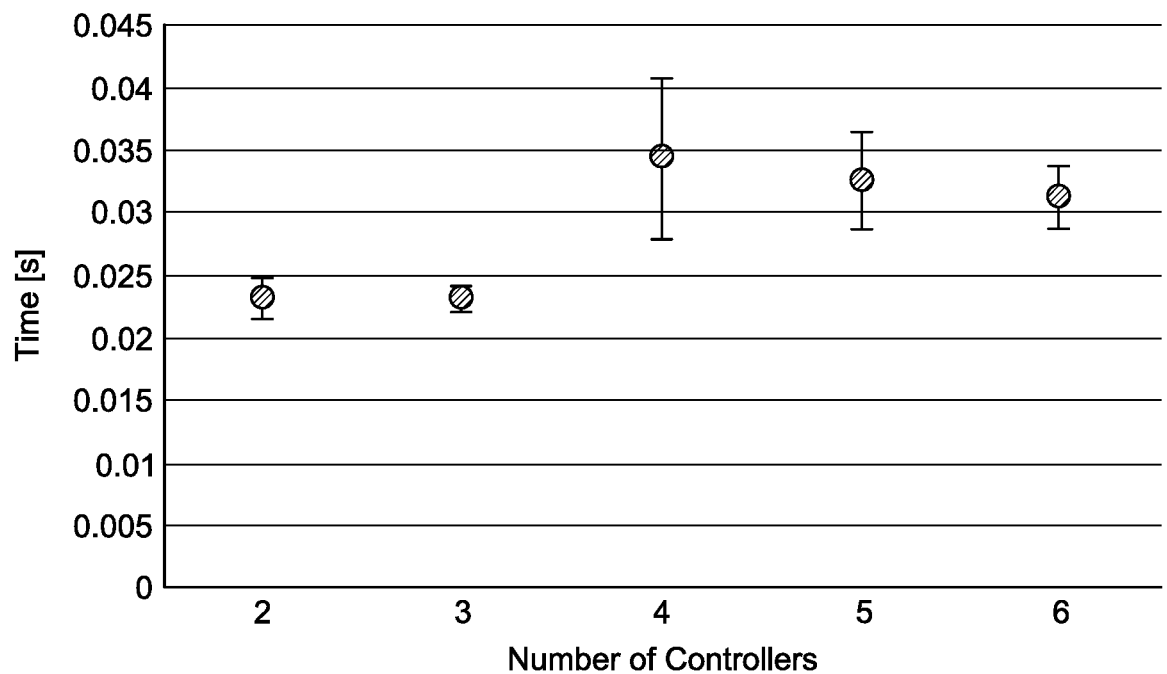
FIG. 11C depicts a time taken by Open Network Operating System (ONOS)-DSF networks to converge into a single, holistic topology, according to one or more embodiments.

Observations of the ONOS-DSF networks in FIG. 11C demonstrates that the performance of the DSF interface does not contribute to the delay in NCP significantly. DSF-based ONOS networks converge to a single, holistic topology within 35 milliseconds on average as the number of controllers increases. The SEM observed for the configurations on average account for 5 milliseconds or less. Furthermore, the delay to reach NCP in ONOS-DSF networks remains consistent as the number of controllers increases in the network. The consistency of the DSF interface measured in FL-DSF platforms attests to this observation.

Figure 11D:
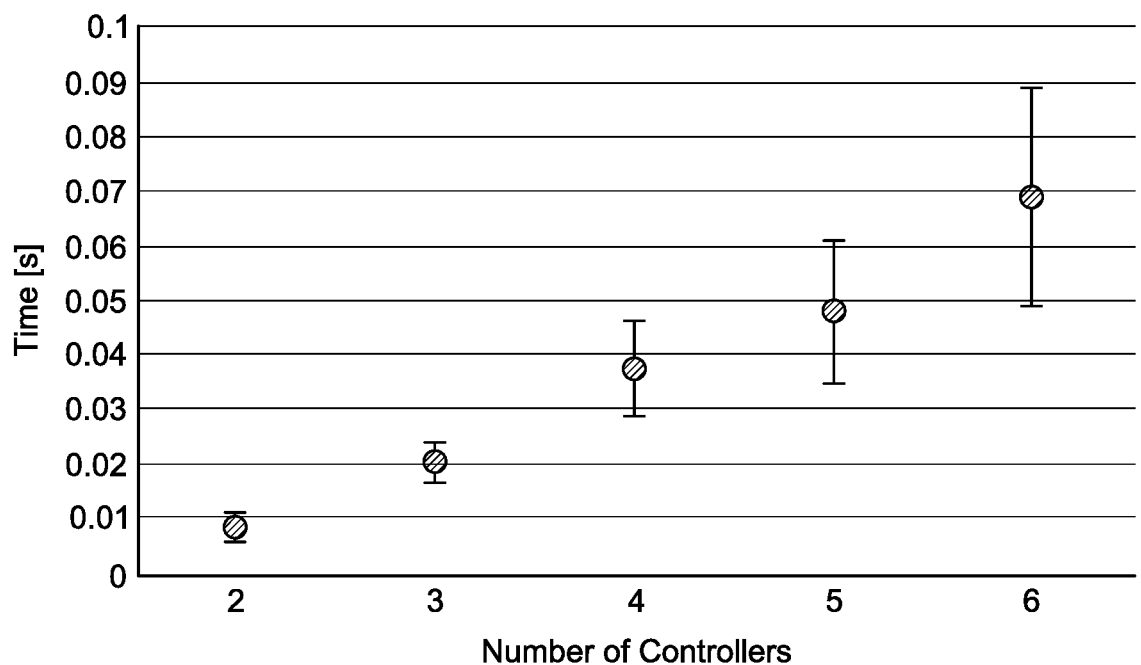
FIG. 11D depicts a time taken by ONOS-cluster networks to converge into a single, holistic topology, according to one or more embodiments.

Comparison of performance between DSF-based ONOS networks and Atomix-based ONOS cluster networks is shown in FIG. 11C and FIG. 11D, respectively. It is observed that an increase in average NCP occurs as the number of ONOS controllers increases in the Atomix-based cluster networks while DSF-based networks consistently converge within 23-35 milliseconds. In addition, the time to reach NCP measured in DSF-based ONOS networks is less than Atomix based ONOS networks when the number of controllers in the configuration is four or more and the time to reach NCP is equal between both configurations at three controllers. Atomix-based networks observe a higher variance in time to NCP between experiments when the number of controllers in configurations is higher, the higher variance is also noted in the TUD metric analysis. Cluster-based distributed systems incur a higher number of control packets to synchronize each entity as participants in the network increase. Atomix agents are the brokers in the cluster synchronizing ONOS controllers and may be the performance bottleneck for larger cluster configurations.

The performance in terms of NCP depends on the SDN control plane platform as expressed by the results in FIG. 11A-D. ONOS is a highly optimized, multi-threaded platform capable of running concurrent modules efficiently as compared to FL. DSF modules in ONOS react in real-time in ONOS regardless of controller state as opposed to FL which has a delayed response in DSF module activity. DSF interface performs consistently in both platforms as the number of controllers increases. The future scope of the study for DSF interface performance evaluation is performing a large-scale emulation of SDN controller platforms to observe the limits of the data-centric RTPS model.

Analysis of Topology Update Delay

FIG. 12A-I depict time taken for controller entities to receive and process a topology update sample. A topology update delay (TUD) of the link update packet to be received and processed by homogeneous controller platforms in 10 repetitions for network configurations FL-DSF shown in FIG. 12A-C, ONOS-DSF shown in FIG. 12D-F, and ONOS-cluster with differing number of controllers per configuration shown in FIG. 12G-I. In the figure, Y-axis indicates a time delay till a topology update is received and processed at controllers in test case configurations: homogeneous DSF-based controller platforms of FL and ONOS networks in FIG. 12A-C and FIG. 12D-F respectively, homogeneous Atomix-based ONOS cluster networks in FIG. 12G-I and heterogeneous data center networks comprising of both DSF-based platforms in FIG. 13.

Figure 12A:
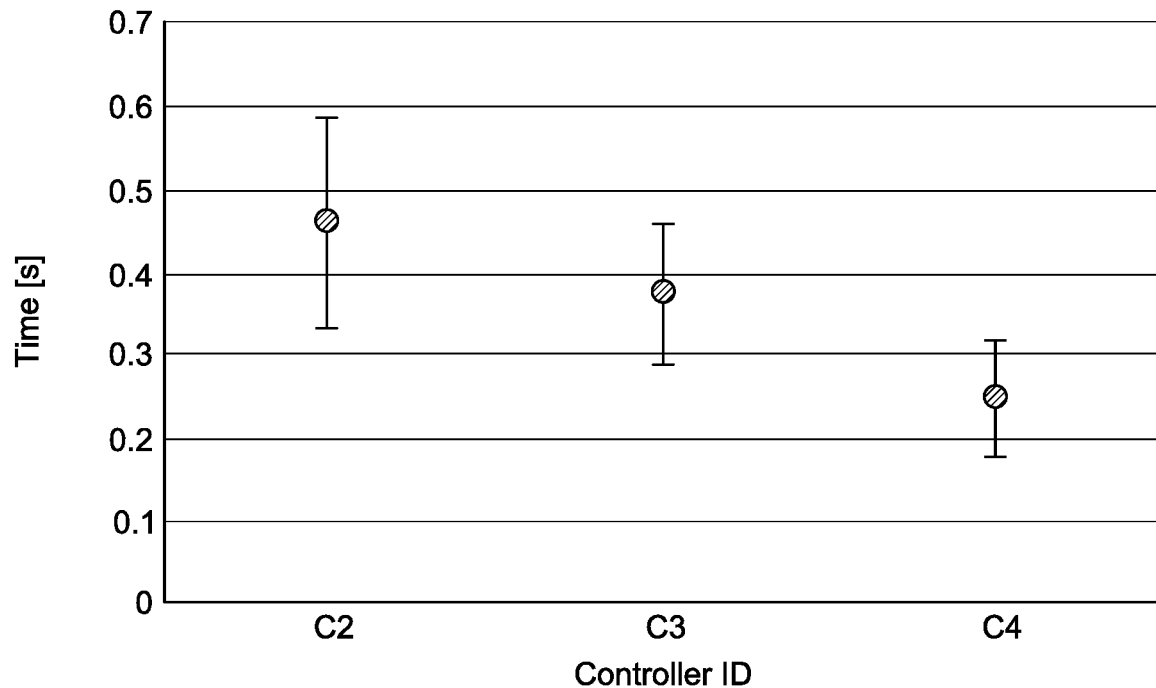
FIGS. 12A-C depict a topology update delay of the link for an FL-DSF network, according to one or more embodiments.
Figure 12B:
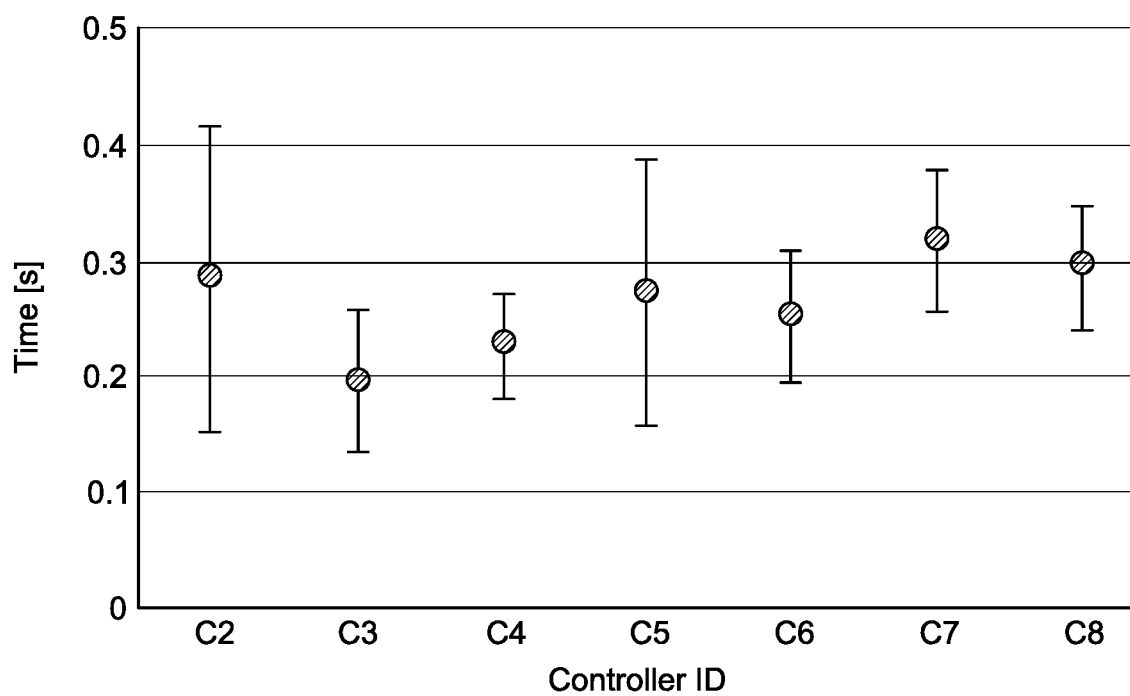
Figure 12C:
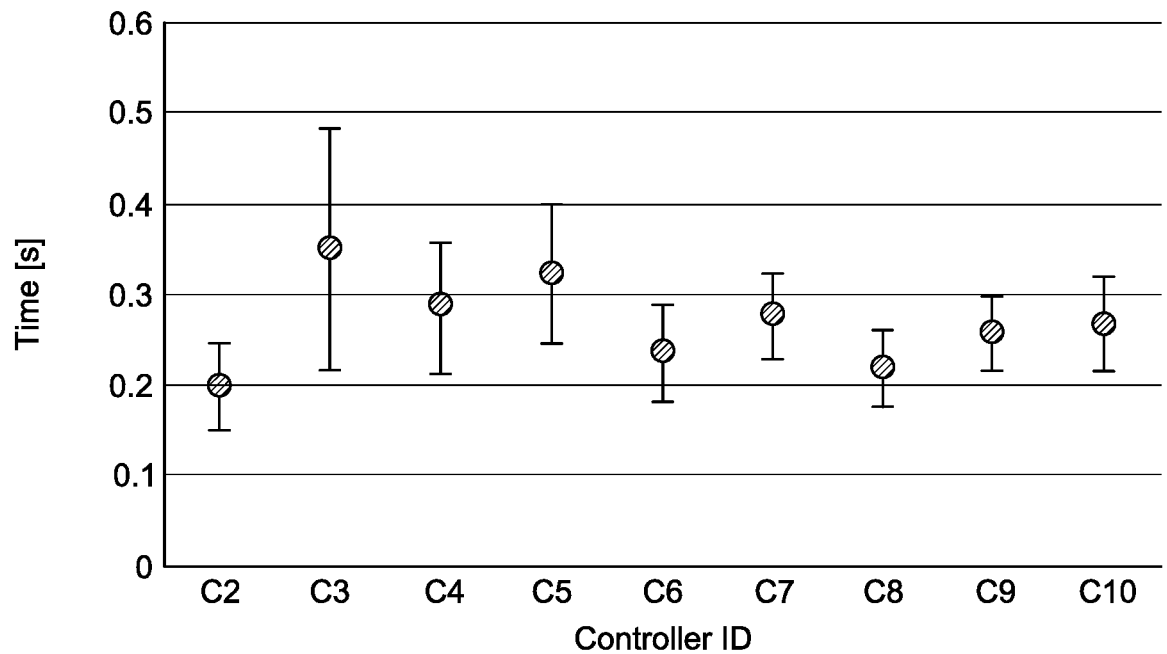

In FIG. 12A, the average topology update delay from 10 repetitions is shown for each FL controller entity in a four controller configuration of the network. The mean delay in receiving the link update is between a quarter of a second and half-a-second for each control plane entity. In 8 and 12 controller configurations shown by FIG. 12B and FIG. 12C respectively, the TUD remains consistent at approximately a quarter of a second. This measurement can be explained by the limitations of the FL controller platform. The optimization of the platform to run its modules concurrently and monitor changes in real-time affects the DSF interface. This is confirmed by the TUD measurements taken in DSF-based ONOS controllers presented in FIG. 12D-F.

Figure 12D:
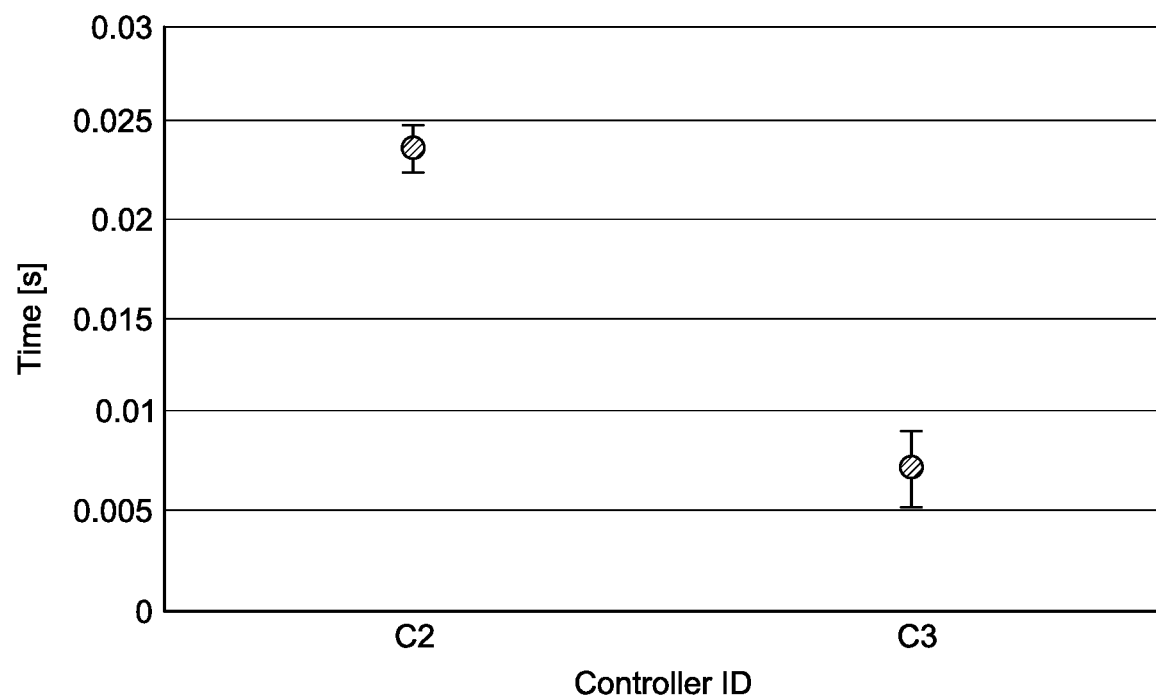
FIGS. 12D-F depict a topology update delay of the link for an ONOS-DSF network, according to one or more embodiments.
Figure 12E:
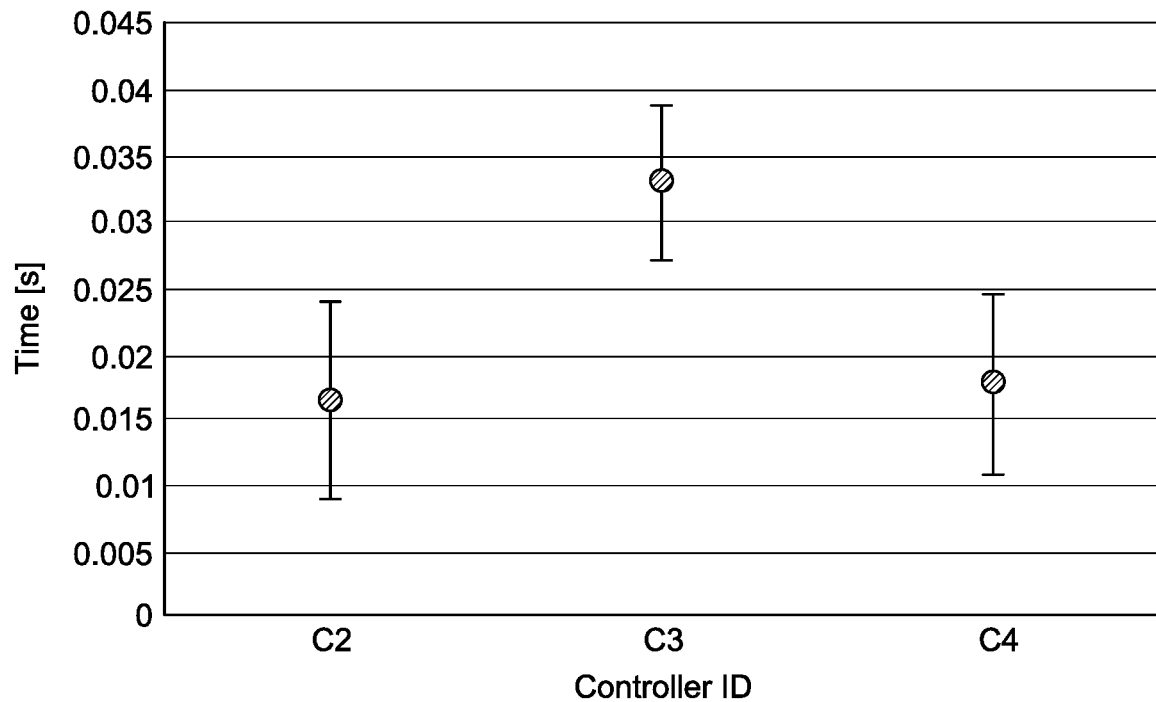
Figure 12F:
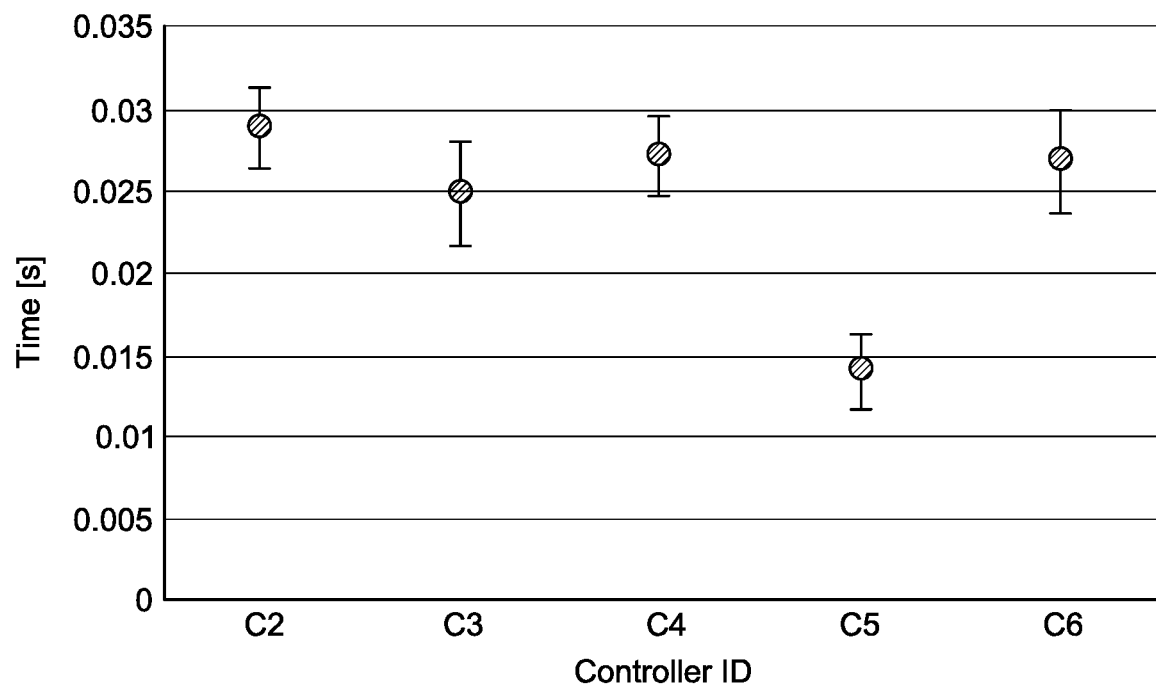

The TUD at each ONOS controller implementing DSF interface in network configurations with 3, 4, and 6 controllers is described by FIG. 12D-F, respectively. ONOS-DSF controllers in FIG. 12D is differed by a margin of 17 milliseconds in TUD over 10 repetitions, this may be attributed to the error margins in experimentation at these timescales. ONOS-DSF results in FIG. 12E if compared to FL-DSF in a similar configuration in FIG. 12A shows that the ONOS-DSF platform performs significantly better in terms of TUD, indicating an optimized concurrent function of modules compared to FL. FIG. 12F results show a highly consistent network where 5 of 6 control plane entities receive the TUD between 25-30 milliseconds while the sixth processes the TUD even faster than its peers at 15 milliseconds over 10 repetitions. An overall consistent, real-time topology synchronization is observed in these configurations using the DSF interface.

Figure 12G:
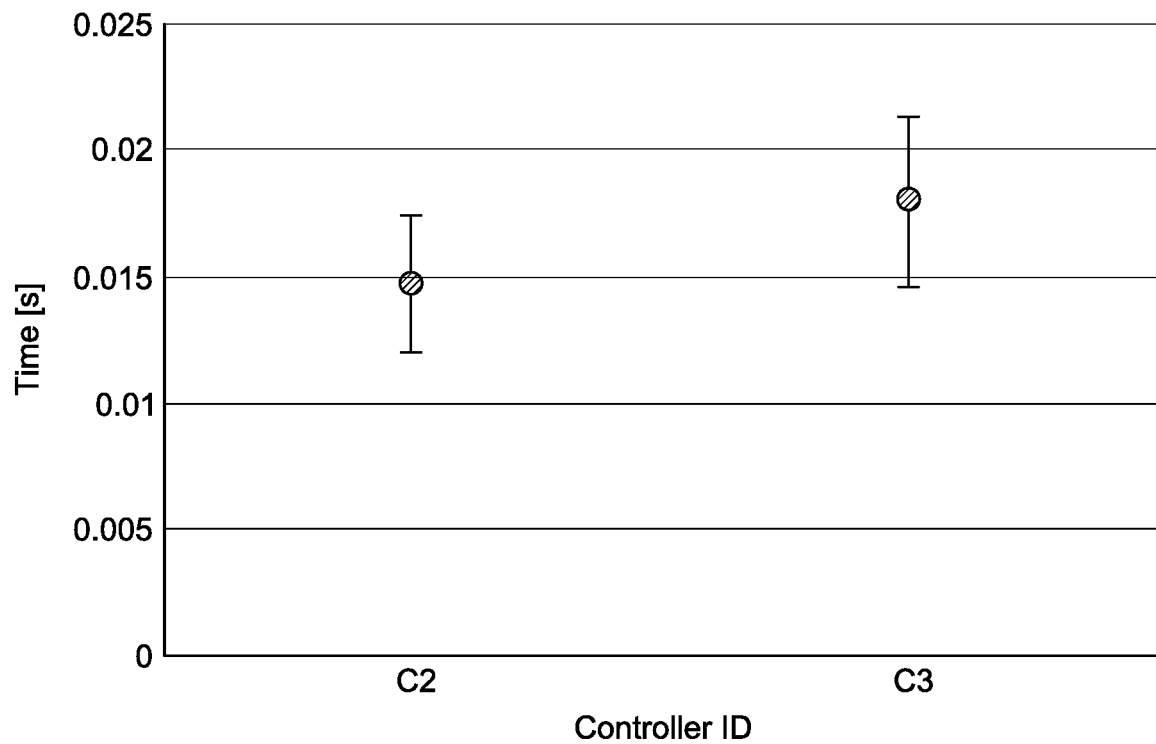
FIGS. 12G-I depict a topology update delay of the link for an ONOS cluster with different numbers of controllers per configuration, according to one or more embodiments.
Figure 12H:
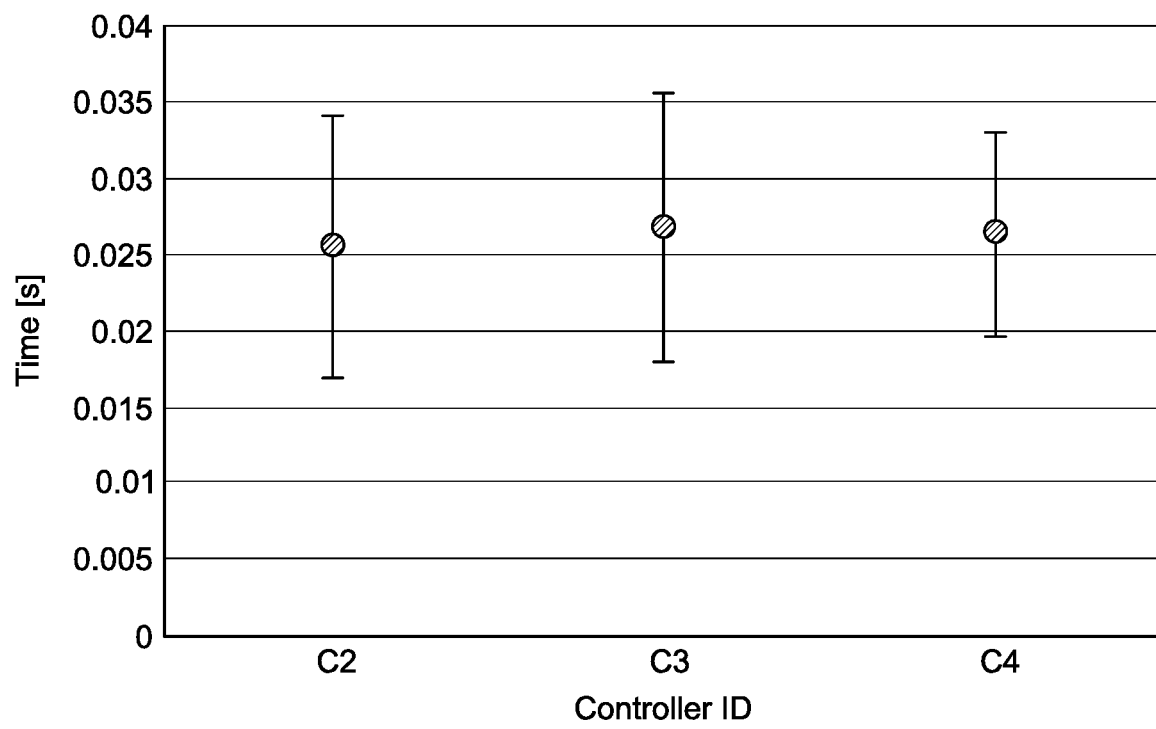
Figure 12I:
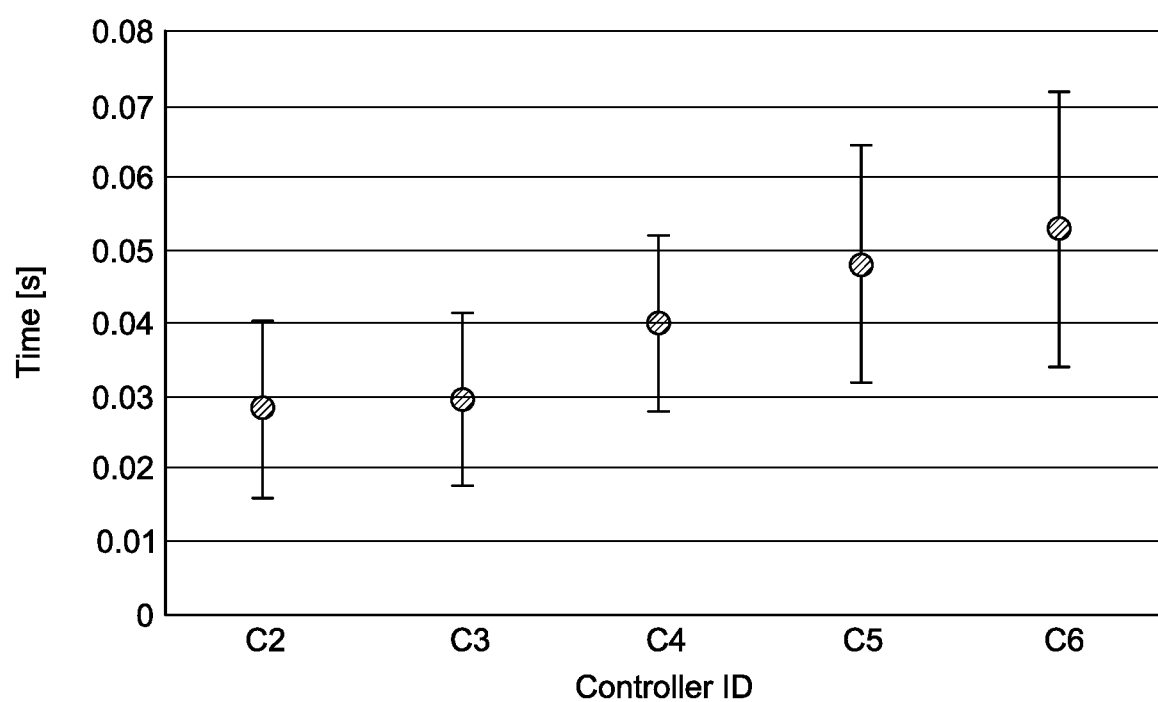

The TUD at each ONOS controller administrated by Atomix-based cluster management brokers in network configurations with 3, 4, and 6 controllers is described by FIG. 12G-I, respectively. In FIG. 12G, both controllers in the 2-controller cluster receive and processes the link update within 3 milliseconds of each other on average. A similar pattern is observed for the 4-controller configuration in FIG. 12H. In configurations with a fewer number of controllers, it is noted that Atomix-based clusters synchronize faster with three Atomix agents. However, as the entities within the cluster increase, some controllers receive and process the update with a larger delay as described by FIG. 12I where controllers with ID C4, C5, and C6 take over 40 milliseconds. In contrast, the disclosed DSF interface implemented on ONOS controllers in the same configuration receives and processes the update within 30 milliseconds, shown by FIG. 12F.

Figure 13A:
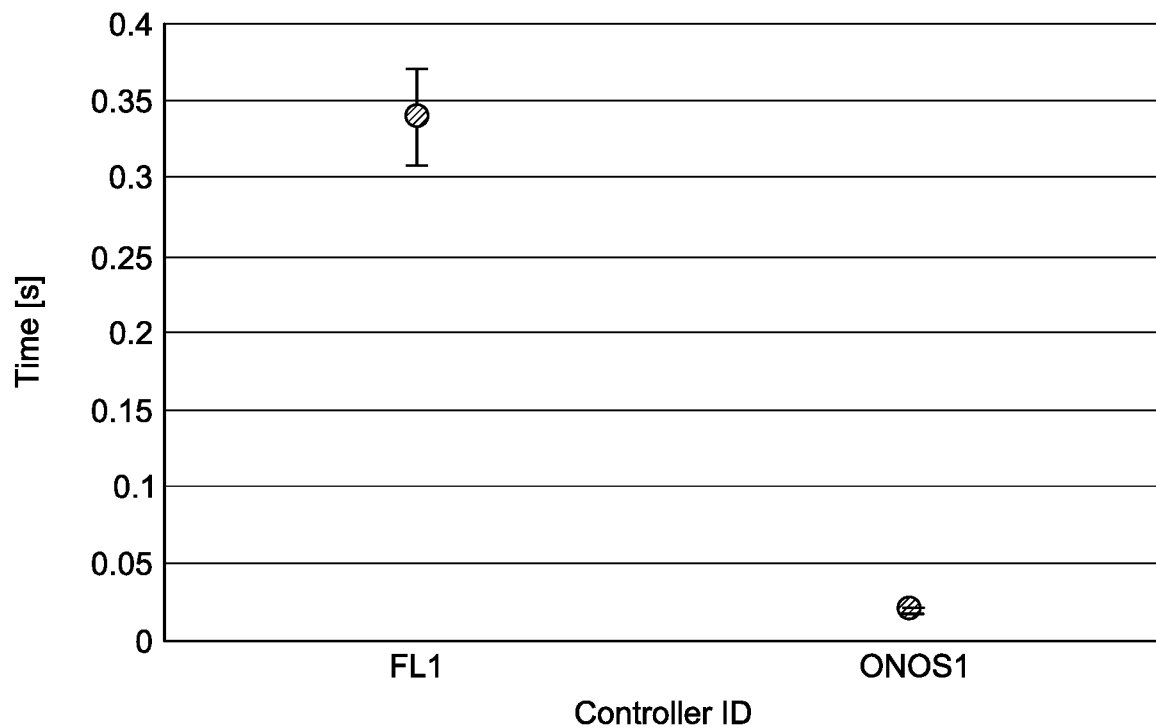
FIG. 13A depicts a topology update delay of a link update time packet to be received and processed by heterogeneous controller platforms in a multi-organization data center network for a configuration having 2-controllers, according to one or more embodiments.
Figure 13B:
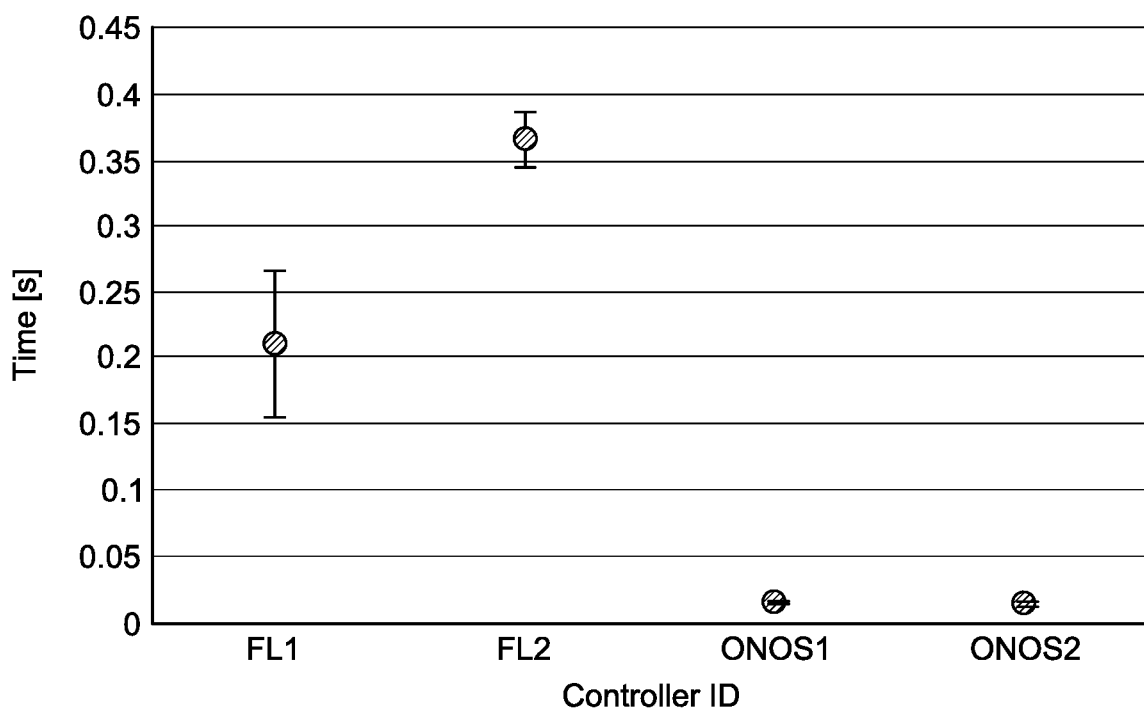
FIG. 13B depicts a topology update delay of a link update time packet to be received and processed by heterogeneous controller platforms in a multi-organization data center network for a configuration having 4-controllers, according to one or more embodiments.
Figure 13C:
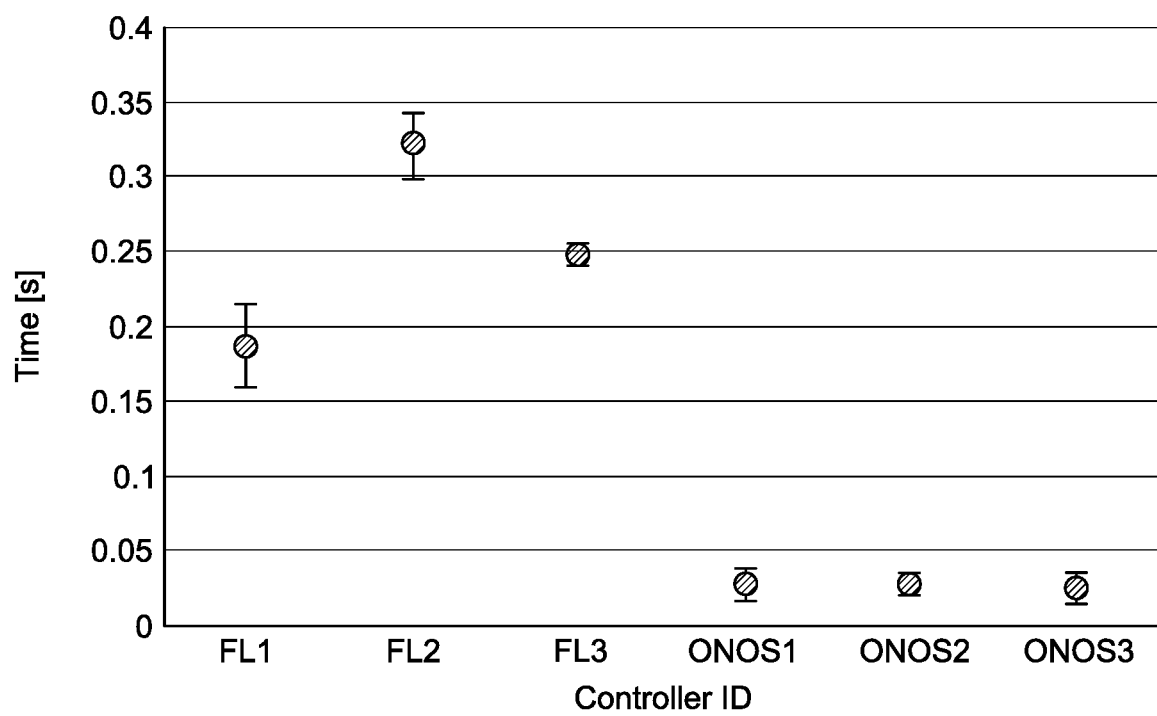
FIG. 13C depicts a topology update delay of a link update time packet to be received and processed by heterogeneous controller platforms in a multi-organization data center network for a configuration having 6-controllers, according to one or more embodiments.

The TUD to receive and process link updates in heterogeneous DCN network configurations with 2, 4 and 6 controllers is described by FIG. 13A, FIG. 13B, and FIG. 13C respectively. The configurations include 1, 2, and 3 controllers from each DSF-based SDN platform. The analysis of NCP results implies that the DCN-DSF configuration topology synchronization time is dependent upon the FL controller processing time. The results in this figure confirm the behavior as ONOS controllers are able to process the link update within 30 milliseconds, while FL controllers take a significantly longer time, ranging between two-tenths and four-tenths of a second.

Markov Chain Analysis of DSF Controller State Transitions

Figure 14A:
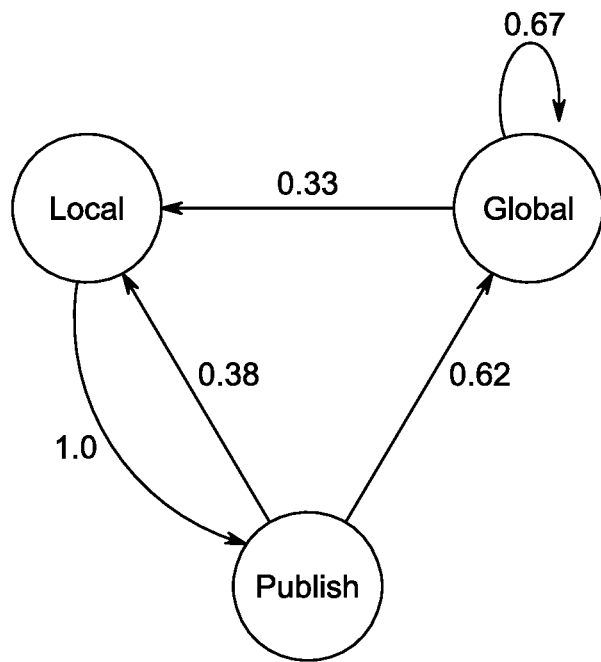
FIG. 14A depicts a Markov chain analysis of DSF controller state transitions from patterns extracted from experiment logs in four-controller configuration, according to one or more embodiments.
Figure 14B:
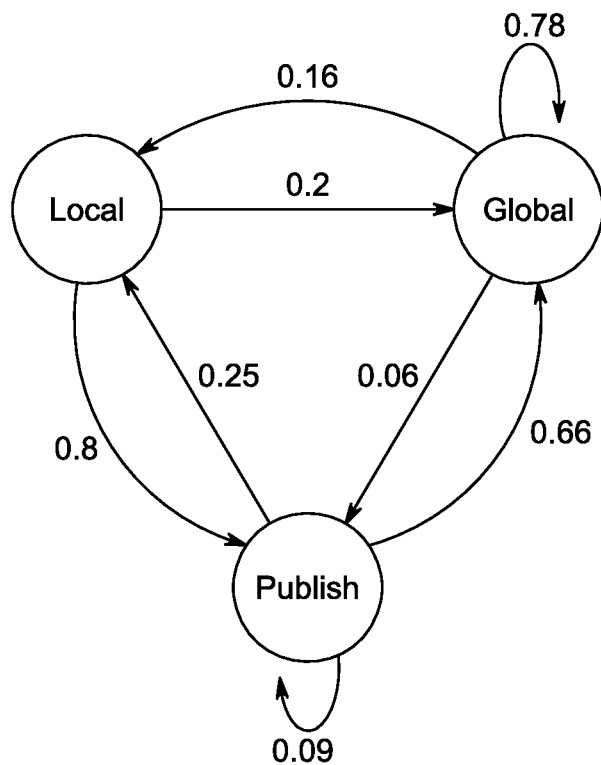
FIG. 14B depicts a Markov chain analysis of DSF controller state transitions from patterns extracted from experiment logs in eight-controller configuration, according to one or more embodiments.
Figure 14C:
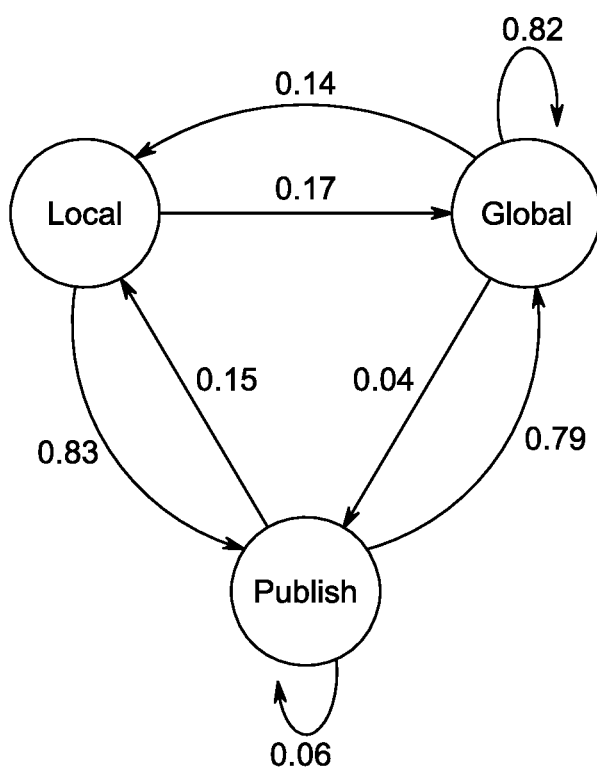
FIG. 14C depicts a Markov chain analysis of DSF controller state transitions from patterns extracted from experiment logs in twelve-controller configuration, according to one or more embodiments.

Markov chain models of DSF-based controller state transitions in network configurations with 4, 8, and 12 controllers is described by FIG. 14A, FIG. 14B, and FIG. 14C respectively. An analysis of the experiment log showed a state transition pattern between three primary controller states: local, global, and publish.

The local state is one of two topology update states which occurs when the local link discovery protocol triggers a link update from a data plane entity administered by the controller. As described by the control flow diagram presented in FIG. 7, the next phase of the controller logic is to update topology followed by publishing the link update through DSF modules, this is known as the publish state. The transition probability is 1.0 due to each link update requiring a publish event, as shown by the 4-controller configuration Markov chain model in FIG. 14A. The second topology update state is referred to as the global state. This state is triggered by a subscription event from the DSF module, subscriber, which listens for peer controller link updates. This is the most frequented state as observed by the transition probabilities due to individual controller listening to all link updates by peer controllers to maintain a consistent view of the network.

An interesting observation was made for configurations with a higher number of DSF controllers in FIG. 14B and FIG. 14C. The probability of state transition between local and publish state p was expected to equal 1.0. However, p is observed to be 0.8 and 0.83, respectively. A closer inspection of the Markov chain models provides an insight into the cause. From the local state, the only other state the controller transitions to is global at a probability of 1−p or 0.2 and 0.17 respectively. The implication of this observation is that after a local update is discovered and before the update is published by the Publisher DSF module, the controller state transition is interrupted by receiving a global update from the DSF module Subscriber. Once the global update state is achieved, the controller transitions from global to publish state to complete the publication of the prior local update.

The transition probabilities between states were generated through a custom Java application written to automate the extraction of state information from the experiment log file, analyze state transition patterns, and generate the probability transition matrix. The following stages of processing occur in the analysis tool: extraction of the transition pattern from the log file, counting the number of unique states (C) from the transition pattern to create a double array of size C-by-C, the summation of the number of state-to-state transitions, and generating the probability transition matrix by dividing the summation C-by-C matrix by the total count of transitions from each state.

FIG. 16 displays the analysis output of the Markov chain tool from a log of an experiment with an 8-controller configuration. A total of 262 state transitions is observed in total for this configuration. For 4 and 12 controller configurations, 122 and 389 state transitions are observed over a time period of 30 minutes in steady-state conditions.

Analysis of RTPS Packet Transmissions

Figure 15:
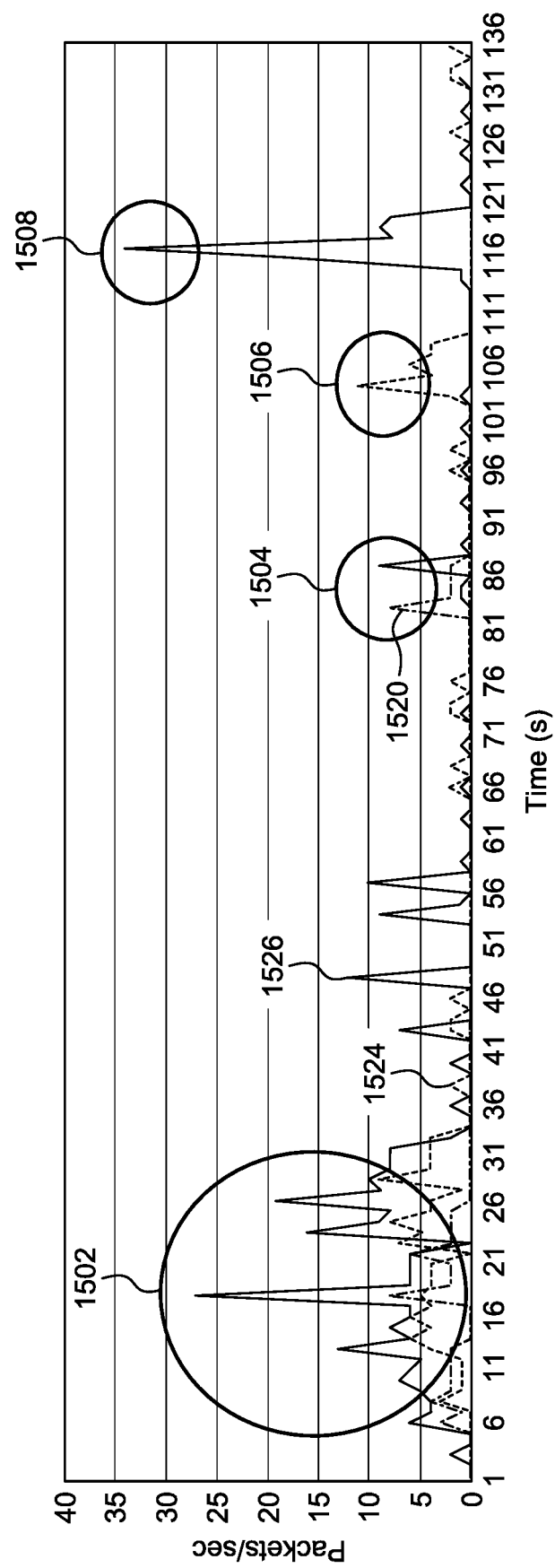
FIG. 15 depicts an RTPS packet transmissions trace of network configurations with 2, 4, and 8 controllers over a time period of 136 seconds, according to one or more embodiments.

FIG. 15 depicts an RTPS packet transmissions trace of network configurations with 2, 4, and 8 controllers (1520 represented by a dot and dashed line, 1524 represented by a dashed line, 1526 represented by a line, respectively) over a time period of 136 seconds captured by a Wireshark network packet analyzer tool. During the initialization of the network (1502), all three configurations observe an increased volume of RTPS packets in the network caused by controllers exchanging their own initial set of data plane entity links. The network with the largest set of controllers reaches the highest packets/sec value at around 27 RTPS packets/second. The RTPS events after the initialization state reduce by a significant amount and stabilize by t=34 seconds, periodically exchanging link updates due to link cost discoveries in terms of latency. When a link update is triggered during the experiment by simulating a link failure, RTPS messages in the network peak again before converging to the single, holistic view (at 1504, 1506 and 1508). In this experiment, the link failure occurred at different times.

Figure 17:
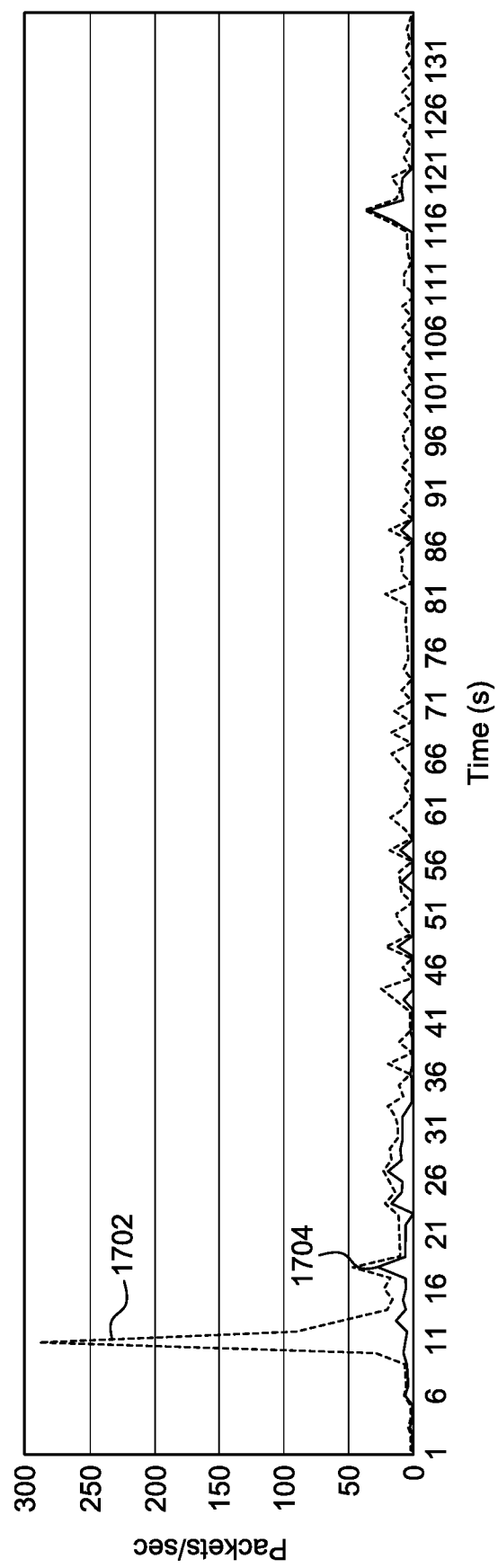
FIG. 17 depicts a packet activity trace over time of all packets transmitted in the network compared to RTPS events in an 8-controller network configuration, according to one or more embodiments.

FIG. 17 displays the packet activity trace over time of all packets (1702) transmitted in the network compared to RTPS events (1704) in an 8-controller network configuration. RTPS events make up a small fraction of the packets transmitted during the initialization process of the network at t=12 seconds. During a link update event, occurring at approximately t=118 seconds, RTPS events make up the majority of packet activity in the network before returning to steady-state.

Figure 18:
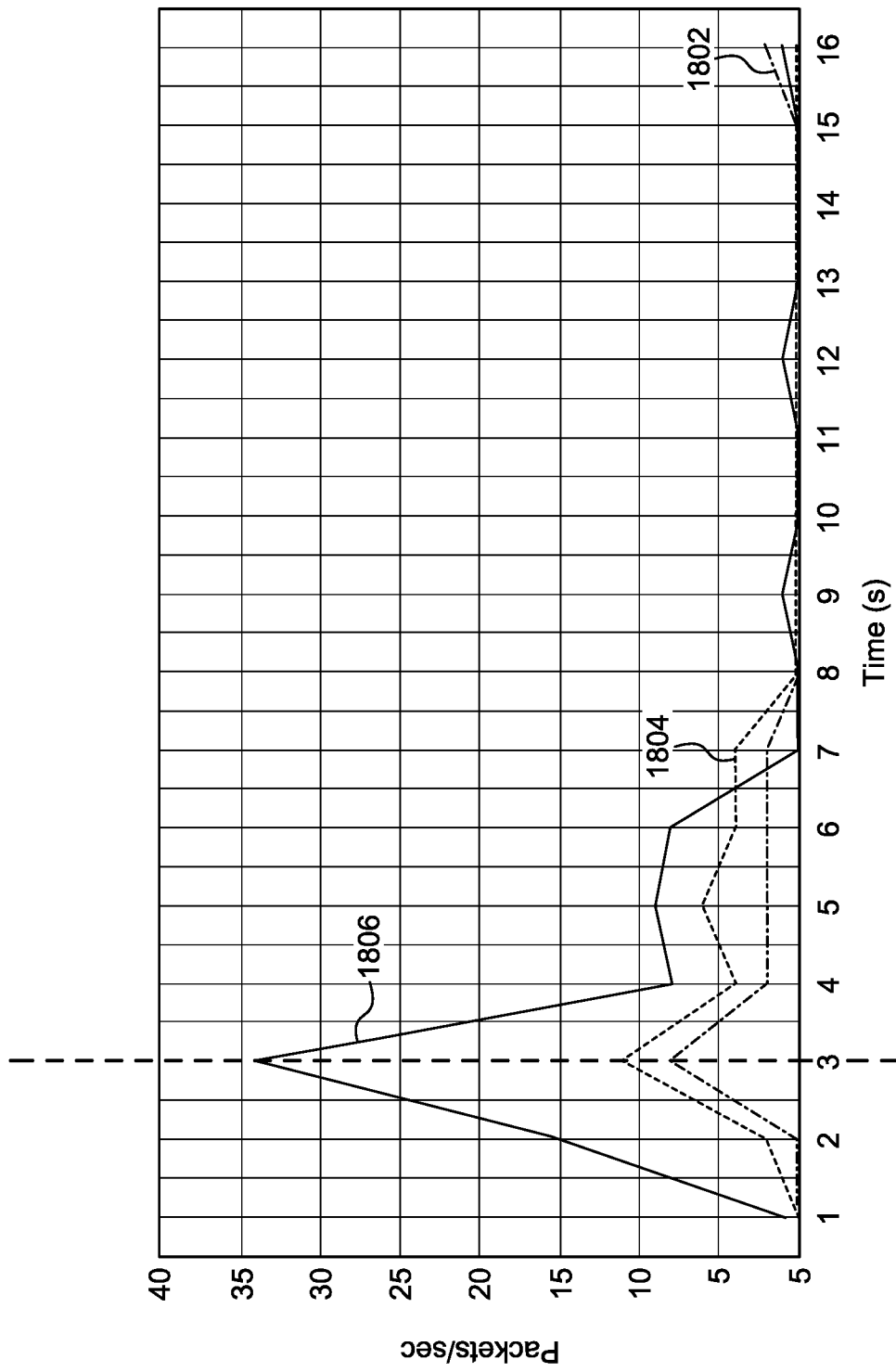
FIG. 18 depicts a behavior of a network during a link update event at t=3 seconds between three network configurations with 2, 4, and 8 controllers, according to one or more embodiments.

FIG. 18 presents the behavior of the network during a link update event at t=3 seconds between three network configurations with 2, 4, and 8 controllers. Configurations with a higher number of controllers transmit more packets/sec in the network, approximately 34 and 11 RTPS packets/sec for configurations 8 and 4 controllers, respectively compared to 8 RTPS packets/sec for configuration with 2 controllers. All three configurations stabilize by t=8 seconds. Regardless of the network configuration, background RTPS control packet mechanisms continue after the link update is transmitted and have no influence on the network convergence time.

Performance Evaluation of NCP

For a thorough performance evaluation of NCP via DSF interface, a Two Factor Full Factorial Design with repetitions was performed. The factors that affect performance are the DSF-based SDN controller platforms and the number of SDN controllers. Each factor contains multiple levels. Table 6 shows the factors and their respective levels evaluated for the performance study.

TABLE 6

Factors and their levels for DSF interface NCP study.

| | Levels | | |
|---|---|---|---|
| Factors | 1 | 2 | 3 |
| Controller Platform | Floodlight-DSF | ONOS-DSF | |
| No. of Controllers | 2 | 4 | 6 |

$y_{ijk}$=Response (observation) in the kth replication of experiment with factors A=No. of Controllers and B=Controller Platforms at levels i=3, j=2, and r=10, respectively, where r is the number of repetitions.

$\mu$=Mean response TABLE 6. Analysis of variation (ANOVA) of network convergence point from a two factor full factorial design with Repetitions.

$\alpha_i$=Effect of factor A at level i;

$\beta_j$=Effect of factor B at level j;

$\gamma_{AB_{ij}}$=Interaction between factors A and B;

$\gamma_{e_{ijk}}$=Experimental error;

Allocation of variation for the aforementioned factorial design is described by the equation below:

$$\sum_{ijk} y_{ijk}^2 = abr\mu^2 + br\sum_j \alpha_j^2 + ar\sum_i \beta_i^2 + r\sum_{ij} \gamma_{ij}^2 + \sum_{ijk} e_{ijk}^2. \quad (5)$$

The results of the ANOVA in Table 7 provide insight into the factors affecting the NCP in the network. The variation of NCP due to the number of controllers is 0.9% from 10 repetitions of the experiments in multiple configurations on both controller platforms. In contrast, the variation of NCP due to controller platforms is 81.3%, confirming the behavior observed in the analysis of performance metrics captured. Experimental errors account for 17.1% of the variation in NCP. DSF interface performance behavior is significantly dependent upon the controller platform it is implemented on.

TABLE 7

Analysis of variation (ANOVA) of network convergence point from a Two Factor full factorial design with repetitions.

| Component | Sum of Squares | % Variation | Degree of Freedom | Mean Square | F-Comp. | F-Table |
|---|---|---|---|---|---|---|
| y | 7.1506 | | 54 | | | |
| ȳ... | | 1 | | | | |
| y − ȳ... | 3.6384 | 100.0 | 53 | | | |
| No. of Controllers | 0.5122 | 0.9 | 2 | 0.0162 | 1.3 | 2.4 |
| Controller Platform | 2.8561 | 81.3 | 1 | 2.8561 | 227.6 | 2.8 |
| Interactions | 0.0214 | 0.6 | 2 | 0.0107 | 0.9 | 2.4 |
| Errors | 0.6023 | 17.1 | 48 | 0.0125 | | |

Another insight from the ANOVA table is the interaction between the factors affecting NCP measurements. The interaction between the controller platform and the number of controllers accounts for 0.6% of the variation in NCP.

From these observations of variation, it can be deduced that the DSF interface performs consistently in the East/

West domain as the number of controllers is scaled up despite the constraints of the controller platform.

Conclusion & Future Works

In this disclosure, the limitations of distributed SDN control plane were highlighted. The lack of a standardized communication method for East/West interfaces among distributed SDN controllers is a primary concern for the adoption in heterogeneous, multi-domain network environments. The disclosure provided a use of a data-centric RTPS communication model among control plane entities to overcome the aforementioned outlined limitations, referred to as DSF—a distributed SDN control in parent/child (vertical) or peer-to-peer (horizontal) manner exchanged link discovery updates in the disclosed LUMP message format to synchronize the holistic topology maintained by participating entities, enabling routing of data plane DSF interface implemented on Floodlight and ONOS controller platforms was conducted in homogeneous and heterogeneous networks. The experiment test cases consisted of controllers maintaining a single, holistic view of the network control plane entities. The performance metrics collected and analyzed showed that the disclosed East/West interface behaved consistently as the number of controllers increased and topology synchronization occurred in real-time, relative Future research includes investigating a data-centric real-time publish/subscribe communication model to enable northbound applications to access the controllers to perform SDN control optimizations. Network optimization techniques such as artificial intelligence to gather, store and process longterm traffic flow patterns to create prediction models of future traffic for pre-emptive fast handovers, mobility, and more. In addition, investigating availability techniques in DSFbased control plane networks, creating new topic structures and QoS profiles for controller-to-controller polling. Furthermore, a comprehensive performance study of the quality-ofservice attributes of the data-centric RTPS-DDS communication paradigm in the DSF interface needs to be studied in a large-scale emulation to identify the key factors affecting performance in a distributed, multi-domain environment.

TABLE 8

Comparison of features between previous East/West techniques and the disclosed DSF interface.

| Proposed Technique | Controller Platform | Programming Language | Network State Dissemination Strategy | | | Coordination strategy | Cross Platform coordination | Data Storage Technique | East/West Protocol |
|---|---|---|---|---|---|---|---|---|---|
| | | | F | Hi | H Y | | | | |
| Hyperflow | NOX | C++ | Y | N | N | Broker-based P2P | N | WheelLFS | Publish/Subscribe via distributed file system |
| ONIX | Onix | C++ | Y | N | N | Cluster | N | Distributed hash table | ZooKeeper API |
| OpenDay Light | OpenDay Light | Java | Y | N | N | Cluster | N | In-memory MD-SAL DB | Akka, Raft |
| ONOS | ONOS | Java | Y | N | N | Cluster | N | Distributed data structure | Raft |
| DISCO | Floodlight | Java | Y | N | N | Broker-based P2P | Y | Extended DB | Publish/Subscribe via AMQP in Client-server mode |
| CIDC | Floodlight | Java | Y | N | N | Broker-based P2P | Y | In-memory DB | Custom event-driven Protocol |
| IRIS | Floodlight | Java | — | Y | N | Leader-based | N | MongoDB | Custom Protocol |
| Kandoo | Kandoo | C++ | — | Y | N | Leader-based | N | In-memory | Messaging Channel |
| DSF | Any | Any | Y | Y | Y | Broker-less P2P | Y | Platform-Dependent | RTPS-DDS standard |

Table 8 shows that the disclosed DSF interface is platform and language agnostic, supporting the flat model architecture, the hierarchical control plane model architecture, and a T-model (hybrid) architecture. As described, the DSF interface works on broker-less P2P coordination strategy with cross platform coordination and uses RTPS-DDS standard.

TABLE 9

Comparison of publish/subscribe models in previous East/West techniques compared to RTPS-DDS used by the proposed DSF interface.

| Protocol | Features | How it works | Applications | Strengths | Weakness |
|---|---|---|---|---|---|
| AMQP | Message-centric Centralized multi-broker | Publish to an exchange agent and queues within the | Financial transaction-based systems, | Reliability (TCP) Interoperability Scales to | Not suitable for largescale fan-out use cases. |

TABLE 9-continued

Comparison of publish/subscribe models in previous East/West techniques compared to RTPS-DDS used by the proposed DSF interface.

| Protocol | Features | How it works | Applications | Strengths | Weakness |
|---|---|---|---|---|---|
|  | architecture client and service protocols | broker entity. AMQP brokers facilitate communication. Focuses on tracking all messages to ensure delivery. | banking | many queues Easy to implement | Single points of failure and bottleneck risks at the queues/brokers. Limited simultaneous read/write operations at queues/brokers. |
| WheelFS | Distributed file system designed for flexible wide-area storage. DDS -Data-centric | Files and directories are spread across storage nodes. Files have a primary and two replicas. Clients cache files. Semantic cues applied to path names control behavior. | Data centers, distributed web cache, multi-site email service | Easy and rapid prototyping of distributed applications Control of performance, durability, and consistency Scales to many file nodes | Limited simultaneous read/write operation at distributed file nodes. Bottlenecks at distributed file storage nodes. |
| DDS | Data-centric Decentralized broker-less architecture: P2P protocol Quality-of-service control Performance oriented | Publish or write to a domain data space with specified topic structure and QoS properties. Peers subscribed to the specific structure and QoS properties read sample from the data space. | High-performance defense, industrial, and embedded applications | Low latency Scales to large number of simultaneous readers/writers No single point of failure Analogous to relational database management system | Requires UDP to avoid establishing large number of connection sessions in large-scale systems. Not suitable for transaction-based systems |

Table 9 shows how the RTPS-DDS used by the proposed DSF interface supports high-performance applications with low latency, allowing rapid scaling with no single point of failure and analogous to RDBMS.

Figure 19:
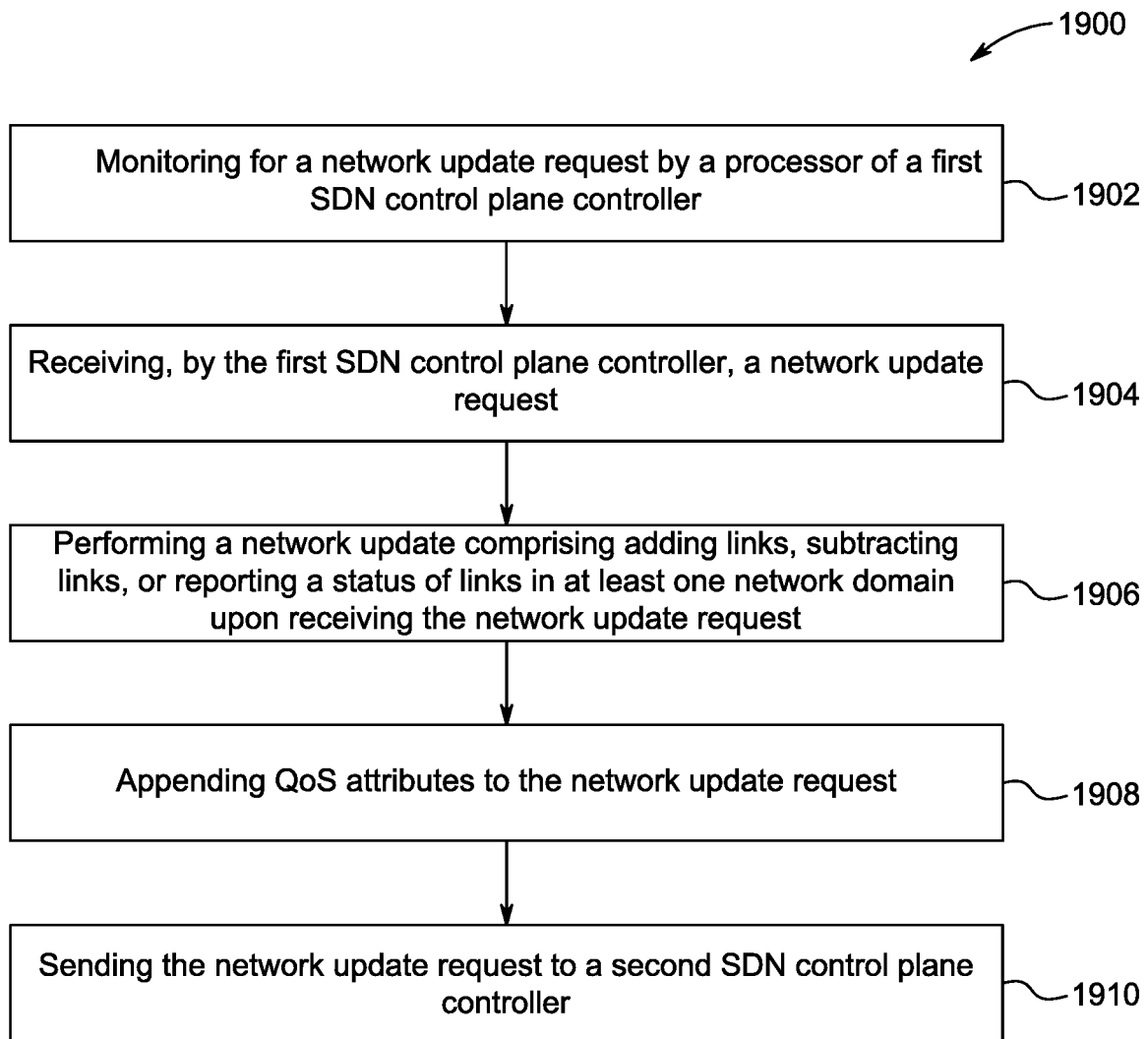
FIG. 19 illustrates a flowchart of a method for using a system, according to one or more embodiments.

FIG. 19 illustrates a flowchart of a method 1900 for using the system 200-400. The method 1100 is described with reference to FIG. 1 through FIG. 18. At step 1902, the method 1900 includes monitoring for a network update request by a processor of a first SDN control plane controller. In some embodiments, the monitoring for network update requests by the first SDN control plane controller is performed asynchronously by multiple threads. At step 1904, the method 1900 includes receiving, by the first SDN control plane controller, a network update request. In some embodiments, the network update request includes a publish message with a specified topic and a specific set of QoS properties. In some embodiments, the network update requests include predefined QOS attributes comprising values for reliability, durability, history, resource limits and lifespan of the network update requests. At step 1906, the method 1900 includes performing a network update comprising adding links, subtracting links, or reporting a status of links in at least one network domain upon receiving the network update request. At step 1908, the method 1900 includes appending QoS attributes to the network update request. At step 1910, the method 1900 includes sending the network update request to a second SDN control plane controller. In some embodiments, the sending to a second SDN control plane controller includes using Object Management Group Data Distribution Service (DDS) standard v2.5.

In some embodiments, the method 1900 includes calculating a new route between SDN control plane controllers. In some embodiments, the method 1900 includes logging of the network updates. In some embodiments, the method 1900 includes encrypting and decrypting of the network update requests. In some embodiments, the method 1900 includes appending a predefined topic to the network update requests.

Obviously, numerous modifications and variations of the present disclosure are possible in light of the above teachings. It is therefore to be understood that within the scope of the appended claims, the invention may be practiced otherwise than as specifically described herein.

The invention claimed is:
1. A software defined network system, comprising:
a global network of multiple network domains, each multiple network domain comprising a plurality of local network domains and a software defined network (SDN) controller, each of the SDN controllers comprising:
network interface circuitry to provide a communicative coupling with at least one local network domain of the multiple network domains;
a processor; and a memory wherein the memory comprises stored instructions that, when executed by the processor, perform a network update comprising:
  adding links, subtracting links or reporting a status of links in at least one first local network domain having a first SDN controller upon receiving a network update request,
  sending, with the first SDN controller, the network update request to a second SDN controller of at least one second local network domain,
  wherein the network update request is part of a real-time publish/subscribe protocol:
    wherein the sending the network update request comprises sending a publish message having a specified topic and a set of QoS attributes, and
    receiving, by the second SDN controller, the network update request and subscribing to the specified topic and the set of QoS attributes,
  wherein the memory of the SDN controller stores instructions to communicate network update requests to a plurality of other SDN controllers each SDN controller comprising a processor, network interface circuitry, and memory, and
  wherein the network update request is shared in a hierarchical vertical model topology with other SDN controllers;
wherein the real-time publish/subscribe protocol conforms to an Object Management Group Data Distribution Service (DDS) standard v2.5.

2. The software defined network system of claim 1, further comprising:
  a global controller comprising
    network interface circuitry to provide a communicative coupling with the multiple network domains; and
    a memory storing the network update request wherein the memory of the global controller can be published to and subscribed to by SDN controllers, the controllers located in separate heterogeneous networks.

3. The software defined network system of claim 1, wherein the QoS attributes for a network update request comprise values for reliability, durability, history, resource limits and lifespan of the network update.

4. The software defined network system of claim 1, wherein the memory further comprises processor instructions which, when executed by the processor provide encrypting and decrypting of the network updates.

5. The software defined network system of claim 1, wherein the network update request is shared via a T-model topology wherein each of the SDN controllers publish the network update received from its own network in a vertical manner in a parent-child fashion until the network update request reaches a root controller of a first network; and wherein the root controller of the first network then transmits it's network update request in a horizontal manner to a second root controller of a second network.

* * * * *